United States Patent
Walker et al.

(10) Patent No.: US 9,100,713 B2
(45) Date of Patent: *Aug. 4, 2015

(54) CUSTOMIZABLE OVERLAYS BASED ON SUBJECT MATTER

(71) Applicant: Rovi Guides, Inc., Santa Clara, CA (US)

(72) Inventors: Todd Walker, Bixby, OK (US); Michael D. Ellis, Boulder, CO (US)

(73) Assignee: Rovi Guides, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/213,706

(22) Filed: Mar. 14, 2014

(65) Prior Publication Data

US 2014/0201793 A1 Jul. 17, 2014

Related U.S. Application Data

(63) Continuation of application No. 13/608,528, filed on Sep. 10, 2012, now Pat. No. 8,695,038, which is a continuation of application No. 12/551,399, filed on Aug. 31, 2009, now Pat. No. 8,281,339, which is a continuation of application No. 10/756,699, filed on Jan. 12, 2004, now abandoned.

(51) Int. Cl.
*H04N 5/445* (2011.01)
*H04N 21/488* (2011.01)
(Continued)

(52) U.S. Cl.
CPC ............. *H04N 21/488* (2013.01); *G06Q 10/00* (2013.01); *G06Q 30/00* (2013.01);
(Continued)

(58) Field of Classification Search
CPC .......... H04N 21/488; H04N 21/43615; H04N 21/4532; H04N 21/4312; H04N 21/47214; H04N 21/478; H04N 21/482; H04N 21/4858; H04N 21/812; G06Q 10/00; G06Q 30/00

USPC ............ 725/45, 40, 61, 25, 86, 104; 348/563, 348/564, 569; 705/14.4
See application file for complete search history.

(56) References Cited

U.S. PATENT DOCUMENTS 3,440,427 A 4/1969 Kammer
3,492,577 A 1/1970 Reiter et al.
(Continued)

FOREIGN PATENT DOCUMENTS

DE 3337204 4/1985
EP 0 393 555 4/1990
(Continued)

OTHER PUBLICATIONS

Edwardson, et al.; "CEEFAX: A Proposed New Broadcasting Ser.," Journal of the SMPTE, Jan. 1974, pp. 14-19.
(Continued)

*Primary Examiner* — Hoang-Vu A Nguyen-Ba
(74) *Attorney, Agent, or Firm* — Ropes & Gray LLP

(57) ABSTRACT

Systems and methods are provided for customizing the display of interactive television overlays. A condition related to the display of an overlay on top of video for a television channel may be defined for each of a plurality of television channels. A default set of information types for an interactive television overlay (e.g., a FLIP overlay, a BROWSE overlay, etc.) may be defined for the plurality of television channels. When the overlay is displayed on top of video for a given television channel of the plurality of television channels, the overlay may include information of the default set of information types. One or more television channels of the plurality of television channels may be identified as channels for which the default set of information types does not apply (e.g., channels for which the overlay is not displayed or for which a custom set of information types is defined).

20 Claims, 24 Drawing Sheets

(51) Int. Cl.
*G06Q 10/00* (2012.01)
*H04N 21/436* (2011.01)
*H04N 21/45* (2011.01)
*H04N 21/431* (2011.01)
*H04N 21/478* (2011.01)
*H04N 21/482* (2011.01)
*H04N 21/485* (2011.01)
*H04N 21/81* (2011.01)
*G06F 3/00* (2006.01)
*H04N 7/173* (2011.01)
*H04N 5/50* (2006.01)
*G06Q 30/00* (2012.01)
*H04N 21/472* (2011.01)
*H04N 5/44* (2011.01)

(52) U.S. Cl.
CPC .... *H04N 21/4312* (2013.01); *H04N 21/43615* (2013.01); *H04N 21/4532* (2013.01); *H04N 21/478* (2013.01); *H04N 21/47214* (2013.01); *H04N 21/482* (2013.01); *H04N 21/4858* (2013.01); *H04N 21/812* (2013.01); *H04N 21/47202* (2013.01); *H04N 2005/443* (2013.01); *H04N 2005/4425* (2013.01); *H04N 2005/44569* (2013.01); *H04N 2005/44595* (2013.01)

(56) References Cited

U.S. PATENT DOCUMENTS

| | | |
|---|---|---|
| 3,493,674 A | 2/1970 | Houghton |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,261,006 A | 4/1981 | Weintraub et al. |
| 4,264,924 A | 4/1981 | Freeman |
| 4,270,145 A | 5/1981 | Farina |
| 4,283,787 A | 8/1981 | Chambers |
| 4,288,809 A | 9/1981 | Yabe |
| 4,305,101 A | 12/1981 | Yarbrough et al. |
| 4,329,684 A | 5/1982 | Monteath et al. |
| 4,337,480 A | 6/1982 | Bourassin et al. |
| 4,337,483 A | 6/1982 | Guillou |
| 4,344,090 A | 8/1982 | Belisomi et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,581 A | 1/1984 | Schweppe et al. |
| 4,429,385 A | 1/1984 | Cichelli et al. |
| 4,449,249 A | 5/1984 | Price |
| 4,456,925 A | 6/1984 | Skerlos et al. |
| 4,477,830 A | 10/1984 | Lindman et al. |
| 4,488,179 A | 12/1984 | Kru/ ger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,536,791 A | 8/1985 | Campbell et al. |
| 4,547,804 A | 10/1985 | Greenberg |
| 4,566,034 A | 1/1986 | Harger et al. |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,620,229 A | 10/1986 | Amano et al. |
| 4,635,121 A | 1/1987 | Hoffman et al. |
| 4,639,779 A | 1/1987 | Greenberg |
| 4,641,205 A | 2/1987 | Beyers, Jr. |
| 4,677,466 A | 6/1987 | Lert, Jr. et al. |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,706,121 A | 11/1987 | Young |
| 4,712,105 A | 12/1987 | Kohler |
| 4,751,578 A | 6/1988 | Reiter et al. |
| 4,754,326 A | 6/1988 | Kram et al. |
| 4,768,228 A | 8/1988 | Clupper et al. |
| 4,775,935 A | 10/1988 | Yourick |
| 4,787,063 A | 11/1988 | Muguet |
| 4,821,102 A | 4/1989 | Ichikawa et al. |
| 4,862,268 A | 8/1989 | Campbell et al. |
| 4,908,707 A | 3/1990 | Kinghorn |
| 4,908,713 A | 3/1990 | Levine |
| 4,959,720 A | 9/1990 | Duffield et al. |
| 4,963,994 A | 10/1990 | Levine |
| 4,977,455 A | 12/1990 | Young |
| 4,991,011 A | 2/1991 | Johnson et al. |
| 4,991,012 A | 2/1991 | Yoshino |
| 5,038,211 A | 8/1991 | Hallenbeck |
| 5,045,947 A | 9/1991 | Beery |
| 5,047,867 A | 9/1991 | Strubbe et al. |
| 5,068,734 A | 11/1991 | Beery |
| 5,103,314 A | 4/1992 | Keenan |
| 5,151,789 A | 9/1992 | Young |
| 5,210,611 A | 5/1993 | Yee et al. |
| 5,214,622 A | 5/1993 | Nemoto et al. |
| 5,220,420 A | 6/1993 | Hoarty et al. |
| 5,223,924 A | 6/1993 | Strubbe |
| 5,231,493 A | 7/1993 | Apitz |
| 5,235,415 A | 8/1993 | Bonicel et al. |
| 5,237,411 A | 8/1993 | Fink et al. |
| 5,237,417 A | 8/1993 | Hayashi et al. |
| 5,253,066 A | 10/1993 | Vogel |
| 5,317,391 A * | 5/1994 | Banker et al. ................ 725/139 |
| 5,353,121 A | 10/1994 | Young et al. |
| 5,357,276 A | 10/1994 | Banker et al. |
| 5,382,983 A | 1/1995 | Kwoh et al. |
| 5,404,393 A | 4/1995 | Remillard |
| 5,410,326 A | 4/1995 | Goldstein |
| 5,477,262 A | 12/1995 | Banker et al. |
| 5,479,268 A | 12/1995 | Young et al. |
| 5,485,221 A | 1/1996 | Banker et al. |
| 5,528,304 A | 6/1996 | Cherrick et al. |
| 5,532,754 A | 7/1996 | Young et al. |
| 5,583,560 A | 12/1996 | Florin et al. |
| 5,585,866 A | 12/1996 | Miller et al. |
| 5,589,892 A | 12/1996 | Knee et al. |
| 5,594,509 A | 1/1997 | Florin et al. |
| 5,621,456 A | 4/1997 | Florin et al. |
| 5,734,853 A | 3/1998 | Hendricks et al. |
| 5,781,246 A | 7/1998 | Alten et al. |
| 5,798,785 A | 8/1998 | Hendricks et al. |
| 5,808,608 A | 9/1998 | Young et al. |

(56) References Cited

U.S. PATENT DOCUMENTS

| | | | |
|---|---|---|---|
| 5,822,123 | A | 10/1998 | Davis et al. |
| 5,986,650 | A | 11/1999 | Ellis et al. |
| 5,990,927 | A | 11/1999 | Hendricks et al. |
| 6,275,268 | B1 | 8/2001 | Ellis et al. |
| 6,331,877 | B1 * | 12/2001 | Bennington et al. ......... 348/731 |
| 6,418,556 | B1 | 7/2002 | Bennington et al. |
| 8,281,339 | B1 | 10/2012 | Walker et al. |
| 8,695,038 | B2 | 4/2014 | Walker et al. |
| 2002/0038241 | A1 | 3/2002 | Hiraga |
| 2009/0241144 | A1 * | 9/2009 | Lajoie et al. .................... 725/40 |
| 2013/0067507 | A1 * | 3/2013 | Leung et al. .................... 725/28 |

FOREIGN PATENT DOCUMENTS

| | | |
|---|---|---|
| EP | 0 396 062 | 11/1990 |
| EP | 0 401 930 | 12/1990 |
| EP | 0 420 123 | 4/1991 |
| EP | 0 444 496 | 9/1991 |
| EP | 0 532 322 | 3/1993 |
| GB | 2 034 995 | 6/1980 |
| GB | 2 256 546 | 12/1992 |
| JP | 61-50470 | 3/1986 |
| JP | 61-74476 | 4/1986 |
| WO | WO 90/15507 | 12/1990 |
| WO | WO 92/04801 | 3/1992 |
| WO | WO 93/11639 | 6/1993 |

OTHER PUBLICATIONS

Hedger, J., "Telesoftware: Home Computing Via Broadcast Teletext;" IEEE Transactions on Consumer Electronics, vol. CE-25, No. 3, Jul. 1979, pp. 279-287.

Baer, R. H.; "Innovative Add-On TV Products," IEEE Transactions on Consumer Electronics, vol. CE-25, Nov. 1979, pp. 765-771.

Hofmann, V. G.; "Videotext Programmiert Videorecorder," Rundfunktech Mitteilungen, Broadcast Engineering Reports, vol. 26, Nov.-Dec. 1982.

Veith, R. H., "Television's Teletext", Elsevier Science Publishing Co., Inc., 1983, pp. 13-20, 45-51.

Lowenstein, et al., "The Inevitable March of Videotex", Technology Review, vol. 88, Oct. 1985, pp. 22.

Cablevision Advertisement for "TV Decisions", Aug. 1986.

Christodoulakis, et al.; "Browsing Within Time-Driven Multimedia Documents", publication of the Institute for Computer Research, University of Waterloo, Waterloo, Ontario, Canada, Jul. 1988, pp. 219-227.

University of Waterloo, Waterloo, Ontario, Canada, Jul. 1988, pp. 219-227.

Schlender, B. R.; "Couch Potatoes: Now It's Smart TV", Fortune, Nov. 20, 1989, pp. 111-116.

Antonofs, M.; "Stay Tuned for Smart TV", Popular Science, Nov. 1990, pp. 62-65.

Various publications of Insight Telecast, 1992 and 1993.

Jerrold Communications Publication, "Cable Television Equipment", dated 1992 and 1993, pp. 8-2.1 to 8-6 and 8-14 to 8-14.3.

Bestler, et al.; "Flexible Data Structure and Interface Rituals for Rapid Development of OSD Applications", 42nd Annual Convention and Exposition of the NCTA, Jun. 6, 1993, San Francisco, CA, pp. 223-236.

Exposition of the NCTA, Jun. 6, 1993, San Francisco, CA, pp. 223-236.

Daily, M.; "Addressable Decoder with Downloadable Operation", Proceedings From the 42nd Annual Convention and Exposition of the NCTA, San Francisco, CA, Jun. 6-9, 1993, pp. 82-89.

NCTA, San Francisco, CA, Jun. 6-9, 1993, pp. 82-89.

Mannes, George; "Smart Screens: Development of Personal Navigation Systems for TV Viewers", Video Magazine, Dec. 1993.

Preview Guide Brochure, Spring 1994.

Transcript of the testimony of Michael Faber and Larry Wangberg, May 1996, pp. 554-743.

Videocipher Stipuation, May 1996.

Transcript of the testimony of Brian Klosterman dated May 12, 1997.

\* cited by examiner

FIG. 14

CUSTOMIZABLE OVERLAYS BASED ON SUBJECT MATTER

CROSS-REFERENCE TO RELATED APPLICATIONS

This application is a continuation of prior U.S. patent application Ser. No. 13/608,528, filed Sep. 10, 2012, now pending, which is a continuation of prior U.S. patent application Ser. No. 12/551,399, filed Aug. 31, 2009, now U.S. Pat. No. 8,281,339, issued Oct. 2, 2012, which is a continuation of prior U.S. patent application Ser. No. 10/756,699, filed Jan. 12, 2004, now abandoned. These prior applications are hereby incorporated by reference herein in their entireties.

BACKGROUND OF THE INVENTION

This invention relates to interactive television systems, and more particularly, to interactive television systems such as interactive television program guide systems having customizable FLIP and BROWSE overlays.

Interactive television systems may be used to provide interactive television program guides in which screens of interactive television program listings are presented to users. Pay-per-view and video-on-demand services, web browsing services, games, home shopping, and other interactive features may be provided using interactive television systems.

In known interactive television systems, a user has an in-home set-top box or other equipment with which the user can interact using a remote control or other user input interface. In a computer environment, the user can access interactive television program guide web sites.

Known interactive television program guides allow the user to view program schedule information in overlays that are displayed on top of video for a currently tuned channel. The overlays may include the title, channel, and run time of the television program that is presently being shown on the currently tuned channel. The overlays may also include program schedule information for television programs other than the program that is presently being shown on the currently tuned channel and other information.

However, known program guide overlays are not customizable. The overlays displayed by known interactive television program guides include only information of a global set of information types that is invariably displayed regardless of which television channel is the currently tuned channel.

In view of the foregoing, it would be desirable to provide systems and methods for providing customizable interactive television overlays.

SUMMARY OF THE INVENTION

It is an object of the present invention to provide systems and methods for providing customizable interactive television overlays.

This and other objects are accomplished in accordance with the principles of the present invention by providing an interactive television application that allows for the customization of the display of interactive television overlays.

Systems and methods for using the interactive television application to provide interactive television features to a user are provided. A default set of information types for an interactive television overlay (e.g., a FLIP overlay, a BROWSE overlay, etc.) may be defined for a plurality of television channels. When the interactive television application displays the overlap on top of video for a given television channel of the plurality of television channels, the interactive television overlay may include information of the default set of information types. An information type is any suitable category of content that may be included in an interactive television overlay. For example, the default set of information types may include the information types of an advertisement, a logo for a service provider, and a program schedule information type such as a program title for the currently broadcasted program on the given television channel (e.g., if the overlay is a FLIP overlay) or a program title for a program other than the currently broadcasted program on the given television channel (e.g., if the overlay is a BROWSE overlay). Information of any other suitable information types may be included in the interactive television overlay (e.g., a program description, a video clip in a reduced-size video window, etc.) One or more television channels of the plurality of television channels may be identified as channels for which the default set of information types does not apply.

In some embodiments of the present invention, a particular television channel for which the default set of information types does not apply may be identified as a result of negotiations with the television broadcaster of the particular television channel (e.g., negotiations between the television broadcaster and a service provider of the interactive television application). The television broadcaster of the particular television channel may, for example, request that the interactive television overlay not include an advertisement, a logo for a service provider, or other information type that may be included in the default set of information types. As another example, the television broadcaster may request that the overlay not be displayed on top of video for the particular television channel.

In some embodiments of the present invention, the particular television channel for which the default set of information types does not apply may be identified as a result of user interactions with the interactive television application. The interactive television application may provide, for example, one or more user input interfaces that allow the user to identify the particular television channel for which the default set of information types does not apply. The interactive television application may also allow the user to modify various conditions related to the display of the interactive television overlay on top of video for the particular television channel. For example, when the display of the interactive television overlay on top of video for the particular television channel is initially disabled (e.g., based on a condition set by a service provider of the interactive television application), the user may be able to use one or more suitable user input interfaces to direct the interactive television application to enable the overlay to be displayed.

In some embodiments of the present invention, a custom set of information types may be defined for the one or more television channels for which the default set of information types does not apply. The custom set of information types may include less than all information types of the default set of information types. For example, the default set of information types may include an advertisement or a logo for a service provider whereas the custom set of information types does not. The custom set of information types may also include information types that are not included in the default set of information types. For example, the custom set of information types may include a program description whereas the default set of information types does not. When the interactive television displays the overlay on top of video for the particular television channel, the overlay may include information of the custom set of information types.

In some embodiments of the present invention, at least one television channel of a plurality of television channels may be identified as a channel for which an interactive television overlay comprising program listings information (e.g., a FLIP overlay) is not displayed. In response to receiving a user indication to tune to a given television channel of the plurality of television channels, video for the given television channel may be displayed for the user. The interactive television application may display the overlay comprising program listings information on top of the video for the given television channel only if the given television channel is not the at least one television channel for which the overlay is not displayed. The at least one television channel for which the interactive television overlay is not displayed may be identified by, for example, a service provider of the interactive television application (e.g., based on negotiations with the television broadcaster of the at least one television channel), based on user interactions with the interactive television application, or a combination thereof.

In some embodiments of the present invention, at least one condition related to the display of an interactive television overlay on top of video for a given television channel may be defined for each of a plurality of television channels. For example, a condition related to the length of time that the overlay is displayed (e.g., 0 seconds), a size of the overlay, a location of the overlay, a color of the overlay, or a font of the overlay may be defined for each of the plurality of television channels. As another example, a-condition related to whether the interactive television overlay includes program schedule information, a logo for a service provider, or an advertisement may be defined for each of the plurality of television channels. At least one of the plurality of television channels may have a condition that is different from a condition of another television channel of the plurality of television channels. In response to receiving a user indication to tune to a particular television channel of the plurality of television channels, the interactive television application may process the at least one condition of the particular television channel to display the overlay according to the at least one condition. Conditions associated with the display of the interactive television overlay on top of video for a television channel of the plurality of television channels may be defined, for example, for the user by a service provider of the interactive television application, based on user interactions with the interactive television application, or based on a combination thereof.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 14 shows an illustrative customized FLIP overlay that is displayed on top of video for a particular television channel for which the default set of FLIP information types does not apply in accordance with the present invention;

DETAILED DESCRIPTION OF THE PREFERRED EMBODIMENTS

Figure 1:
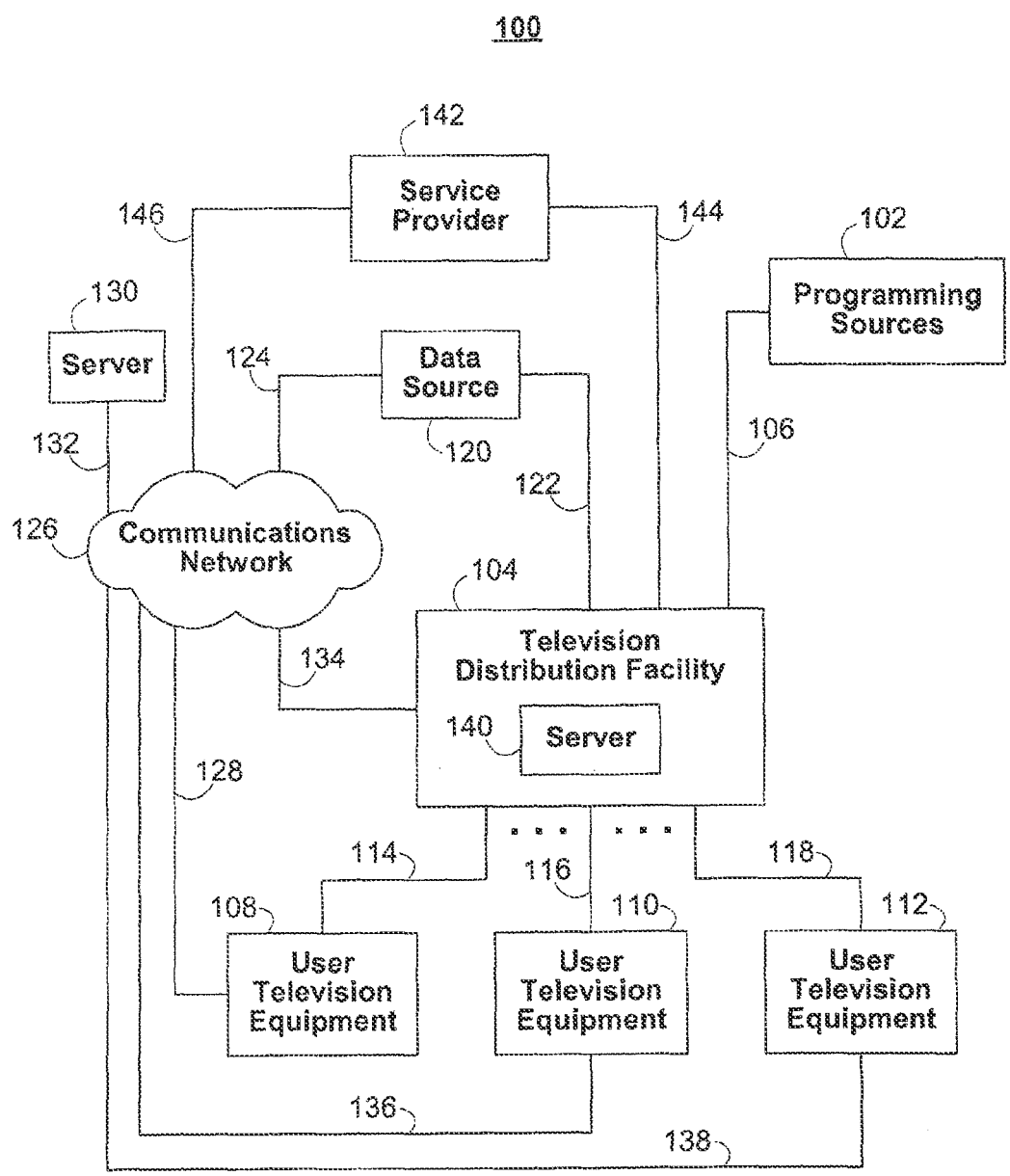
FIG. 1 is a diagram of an illustrative interactive television system in accordance with the present invention.

An illustrative interactive television system 100 in accordance with the present invention is shown in FIG. 1. Content such as television programming and digital music may be provided from programming sources 102 to television distribution facilities such as television distribution facility 104 using communications path 106. Programming sources 102 may be any suitable sources of television and music programming, such as television broadcasters (e.g., NBC, ABC, and HBO) or other television or music production studios.

Television distribution facility 104 may be a cable system headend, a satellite television distribution facility, a television broadcaster, or any other suitable facility for distributing television and music programming to users. There are typically numerous television distribution facilities 104 in system 100, but only one is shown in FIG. 1 to avoid overcomplicating the drawing.

Communications path 106 may be a satellite path, a fiber-optic path, a cable path, or any other suitable wired or wireless communications path or combination of such paths.

Television distribution facility 104 may be connected to various user equipment devices 108. Such user equipment 108 may be located, for example, in the homes of users. User equipment 108 may include user television equipment 110 or user computer equipment 112.

The user equipment may receive television and music programming and other data from television distribution facility 104 over communications paths such as communications paths 114, 116, and 118. The user equipment may also transmit signals to television distribution facility 104 over paths 114, 116, and 118. Paths 114, 116, and 118 may be cables or other wired connections, free-space connections (e.g., for broadcast or other wireless signals), satellite links, or any other suitable link or combination of links.

Data source 120 in system 100 may include a program listings database that is used to provide the user with television program schedule information such as scheduled broadcast times, titles, channels, ratings information (e.g., parental ratings and critic's ratings), detailed title descriptions, genre or category information (e.g., sports, news, movies, etc.), and information on actors and actresses. Data source 120 may also be used to provide advertisements (e.g., program guide advertisements and advertisements for other interactive television applications), real-time data such as sports scores, stock quotes, news data, and weather data, application data for one or more interactive television applications, and any other suitable data for use by system 100. For example, data source 120 may provide data indicating whether customized interactive television overlays (e.g., a customized FLIP or BROWSE overlay) are to be displayed on top of video for a given television channel. As another example, data source 120 may provide data indicating the types of information that may be included in the interactive television overlays (e.g., at the request of the user, absent user modification, etc.).

There may be multiple data sources such as data source 120 in system 100, although only one is shown in FIG. 1 to avoid overcomplicating the drawing. For example, a separate data source 120 may be associated with each of a plurality of television broadcasters and may provide data that is specific to those broadcasters (e.g., advertisements for future programming of the broadcasters, logo data for displaying broadcasters' logos in program guide display screens, instructions to be used by the interactive television application to customize the display of overlays such as FLIP and BROWSE overlays on top of video for one or more television channels that are associated with the broadcasters, etc.). Data source 120 and the other system components of FIG. 1 may be provided using equipment at one or more locations. Systems components are drawn as single boxes in FIG. 1 to avoid overcomplicating the drawings.

In some embodiments of the present invention, data source 120 may provide program schedule data and other data to television distribution facility 104 over communications path 122 for distribution to the associated user equipment over paths 114, 116, and 118 (e.g., when data source 120 is located at a main facility). Communications path 122 may be any suitable communications path such as a satellite communications path or other wireless path, a fiber-optic or other wired communications path, a path that supports Internet communications, or other suitable path or combination of such paths.

In some embodiments of the present invention, data source 120 may provide program schedule data and other data directly to user equipment 108 over path 124, communications network 126, and path 128 (e.g., when data source 120 is located at a facility such as one of programming sources 102). Paths 124 and 128 may be wired paths such as a telephone lines, cable paths, fiber-optic paths, satellite paths, wireless paths, any other suitable paths or a combinations of such paths. Communications network 126 may be any suitable communications network, such as the Internet, the public switched telephone network, or a packet-based network.

Program schedule data and other interactive television data may be provided to user equipment using any suitable approach. For example, program schedule data and other data may be provided to the user equipment on a television channel sideband, in the vertical blanking interval of a television channel, using an in-band digital signal, using an out-of-band digital signal, or by any other suitable data transmission technique. Program schedule data and other data may be provided to user equipment on multiple analog or digital television channels. Program schedule data and other data may be provided to the user equipment with any suitable frequency (e.g., continuously, daily, in response to a request from user equipment, etc.).

User equipment devices such as user television equipment and personal computers may use the program schedule data and other interactive television data to display program listings and other information (e.g., information on digital music) for the user. An interactive television program guide application or other suitable interactive television application may be used to display the information on the user's display (e.g., in one or more overlays that are displayed on top of video for a given television channel). Interactive television displays may be generated and displayed for the user using any suitable approach. In one suitable approach, television distribution facility 104 or other facility may generate application display screens and may transmit the display screens to user equipment for display. In another suitable approach, user equipment may store data for use in one or more interactive television displays (e.g., program schedule data, advertisements, logos, etc.), and an interactive television application implemented at least partially on the user equipment may generate the interactive television displays based on instructions received from television distribution facility 104 or other facility. In some embodiments of the present invention, user equipment may store only the program schedule data and other data that is used to generate the interactive television displays (e.g., storing logo data for a particular television broadcaster only if the logo is to be included in one or more interactive television displays). In some embodiments of the present invention, user equipment may store various program schedule data and other data that is not necessarily used to generate the interactive television displays (e.g., storing advertisements associated with a particular television broadcaster that may or may not be displayed depending on, for example, the outcome of negotiations with the television broadcaster). Any other suitable approach or combination of approaches may be used to generate and display interactive television overlays for the user.

An on-line program guide and other interactive television services may be provided using a server connected to communications network 126 such as server 130. Server 130 may receive program schedule data and other data from data source 120 via communications path 124, communications network 126, and communications path 132 or via another suitable path or combination of paths. Path 132 may be a satellite path, fiber-optic path, wired path, or any other path or combination of paths.

User equipment 108 may access on-line program guide data and other data from server 130 via communications path 128. User equipment 108 may also access the on-line program guide and other services on server 130 via communications path 114, television distribution facility 104, and communications path 134. For example, a cable modem or other suitable equipment may be used by user equipment 108 to communicate with television distribution facility 104. Television distribution facility 104 may communicate with communications network 126 over any suitable-path 134, such as a wired path, a cable path, fiber-optic path, satellite path, or combination of such paths.

User equipment such as user television equipment 110 an user computer equipment 112 may access the on-line program guide and server 130 using similar arrangements. User television equipment 110 may access the on-line program guide and server 130 using communications path 136 or using path 116, television distribution facility 104, and path 134. User computer equipment 112 may access the on-line program guide and server 130 using communications path 138 or using path 118, television distribution facility 104, and path 134. Paths. 136 and 138 may be any suitable paths such as wired paths, cable paths, fiber-optic paths, wireless paths, satellite paths, or a combination of such paths.

Program guide application functions and the functions of other interactive television applications may be supported using server 130 and other servers connected to communications network 126 such as server 140. Interactive television applications may also be supported by servers or other suitable equipment at one or more service providers such as service provider 142. For example, a home shopping service may be supported by a service provider such as service provider 142 that has sales representatives, order fulfillment facilities, account maintenance facilities, and other equipment for supporting interactive home shopping features. A home shopping application that is implemented using the user equipment may be used to access the service provider to provide such features to the user. The user equipment may access service provider 142 via television distribution facility 104 and communications path 144 or via communications network 126 and communications path 146. Communications paths such as paths 144 and 146 may be any suitable paths such as wired paths, cable paths, fiber-optic paths, satellite paths, or a combination of such paths.

Another example of an interactive television application is a home banking application. A home banking service may be supported using personnel at facilities such as service provider 142. An interactive home banking application that is implemented using the user equipment may access the home banking service via television distribution facility 104 and communications path 144 or via communications network 126 and communications path 146.

If desired, an interactive television application such as a network-based video recorder or a video-on-demand application may be supported using server 140, server 130, or equipment at service provider 142. Video-on-demand content and video recorded using a network-based video recorder arrangement may be stored on server 140 or server 130 or at service provider 142 and may be provided to the user equipment when requested by users. An interactive television application may be used to support the functions of a personal video recorder (sometimes called a digital video recorder) that is implemented using user equipment 108. Illustrative equipment that may be used to support personal video recorder functions include specialized personal video recorder devices, integrated receiver decoders (IRDs), set-top boxes with integrated or external hard drives, or personal computers with video recording capabilities.

If desired, interactive television applications such as an interactive television program guide application, a home shopping application, a home banking application, a video-on-demand application, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping, network-based video recorder functions, personal video recorder functions, navigational functions, program guide functions, communications functions, and other suitable functions may be provided using one application or any other suitable number of applications. This one or more applications may display on user equipment various overlays including interactive television information on top of video for a given television channel.

The interactive television program guide application, the home banking application, the home shopping application, the network-based video recorder and personal video recorder applications, the video-on-demand application, the gaming applications, communications applications, and navigational applications are only a few illustrative examples of the types of interactive television applications that may be supported by system 100. Other suitable applications that may be supported include news services, web browsing and other Internet services, and interactive wagering services (e.g., for wagering on horse races, sporting events, and the like). Interactive television overlays that are displayed by these applications may also be customized in accordance with the present invention.

The interactive television application or applications that are used in interactive television system 100 may be implemented locally on the user equipment. The applications may also be implemented in a distributed fashion (e.g., using a client-server architecture in which the user equipment serves at least partly and for at least some of the time as the client and a server such as server 140 at television distribution facility 104, server 130, or other suitable equipment acts as the server). Other distributed architectures may also be used if desired. Moreover, some or all of the interactive television system features of system 100 may be provided using operating system software or middleware software. Such operating system software and middleware may be used instead of or in combination with application-level software. Regardless of the particular arrangement used to implement interactive television features related to, for example, program guides, home shopping, home banking, video-on-demand, Internet, and communications, the software that supports these features may be referred to as an application or applications.

Figure 2:
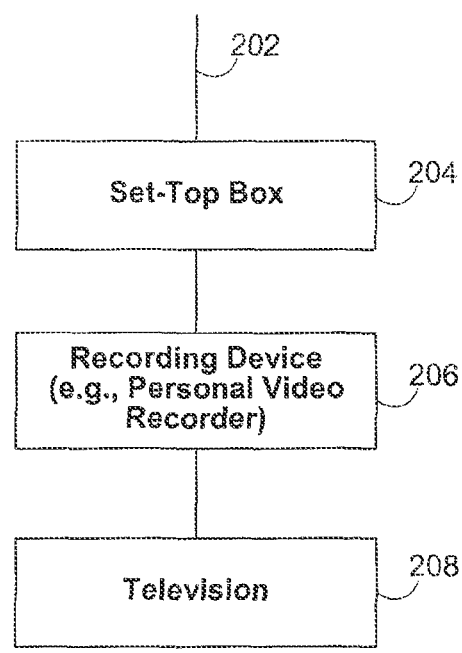
FIG. 2 is a diagram of illustrative user television equipment in accordance with the present invention.

Illustrative user television equipment 110 (FIG. 1) that is based on a set-top box arrangement is shown in FIG. 2. Input/output 202 may be connected to communications paths such as paths 116 and 136 (FIG. 1). Input/output functions may be provided by one or more wires or communications paths, but are shown as a single path in FIG. 2 to avoid overcomplicating the drawing. Television programming, program guide data, and any other suitable interactive television or other data may be received using input/output 202. Commands and requests and other data generated as a result of user interactions with the interactive television application may also be transmitted over input/output 202.

Set-top box 204 may be any suitable analog or digital set-top box (e.g., a cable set-top box). Set-top box 204 may contain an analog tuner for tuning to a desired analog television channel (e.g., a channel comprising television programming, interactive television data, or both). Set-top box 204 may also contain digital decoding circuitry for receiving digital television channels (e.g., channels comprising television or music programming, interactive television data, etc.). Both analog and digital channels may be handled together if desired. Multiple tuners may be provided (e.g., to handle simultaneous watch and record functions or picture-in-picture (PIP) functions). Box 204 may be an integrated receiver decoder (IRD) that handles satellite television. If desired, box 204 may have circuitry for handling cable, over-the-air broadcast, and satellite content. Box 204 may include a storage device (e.g., a digital storage device such as a hard disk drive) for providing recording capabilities. Box 204 may also be connected to a recording device 206 such as a video cassette recorder, personal video recorder, or other device or devices with storage capabilities.

Set-top box 204 contains a processor (e.g., a microcontroller or microprocessor or the like) that is used to execute software applications. Set-top box 204 may contain memory such as random-access memory for use when executing applications. Nonvolatile memory may also be used (e.g., to launch a boot-up routine and other instructions). Hard disk storage in box 204 or in recording device 206 may be used to back up data and to otherwise support larger databases and storage requirements than may be supported using random-access memory approaches.

Set-top box 204 may have infrared (IR) or other communications circuitry for communicating with a remote control or wireless keyboard. Set-top box 204 may also have dedicated buttons and a front-panel display. The front-panel display may, for example, be used to display the current channel to which the set-top box is tuned.

Set-top box 204 may also have communications circuitry such as a cable modem, an integrated services digital network (ISDN) modem, a digital subscriber line (DSL) modem, a telephone modem, or a wireless modem for communications with other equipment. Such communications may involve the Internet or any other suitable communications networks or paths. If desired, the components of set-top box 204 may be integrated into other user equipment (e.g., a television or videocassette recorder).

Recording device 206 may be used to record videos provided by set-top box 204. For example, if set-top box 204 is tuned to a given television channel, the video signal for that television channel may be passed to recording device 206 for recording on a videocassette, compact disc, digital video disk, or internal hard drive or other storage device. Recording device 206 may have communications circuitry such as a cable modem, an ISDN modem, a DSL modem, or a telephone modem for communications with other equipment. Such communications may involve the Internet or any other suitable communications networks or paths. The components of recording device 206 may be integrated into other user equipment (e.g., a television, stereo equipment, etc.).

Recording device 206 may be controlled using a remote control or other suitable user interface. If desired, video recorder functions such as start, stop, record and other functions for device 206 may be controlled by set-top box 204. For example, set-top box 204 may control recording device 206 using infrared commands directed toward the remote control inputs of recording device 206 or set-top box 204 may control recording device 206 using other wired or wireless communications paths between box 204 and device 206.

The output of recording device 206 may be provided to television 208 for display to the user. If desired, multiple recording devices 206 or no recording device 206 may be used. If recording device 206 is not present or is not being actively used, the video signals from set-top box 204 may be provided directly to television 208. Any suitable television or monitor may be used to display the video. In the equipment of FIG. 2 and the other equipment of system 100 (FIG. 1), the audio associated with various video items is typically distributed with those video items and is generally played back to the user as the videos are played.

Figure 3:
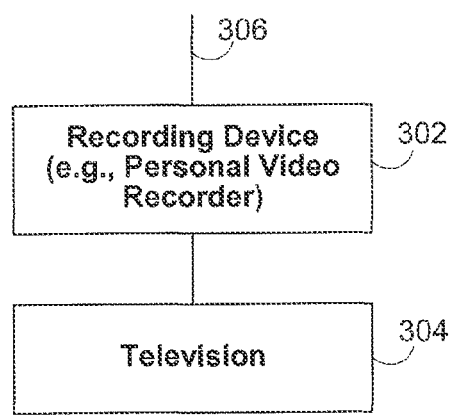
FIG. 3 is a diagram of additional illustrative user television equipment in accordance with the present invention.

Another illustrative arrangement for user television equipment 110 (FIG. 1) is shown in FIG. 3. In the example of FIG. 3, user television equipment 110 includes a recording device 302 such as a digital video recorder (e.g., a personal video recorder (PVR)) that uses a hard disk or other storage for recording video or may be a digital video disc recorder, compact disc recorder, videocassette recorder, or other suitable recording device. Equipment 110 of FIG. 3 may also include a television 304. Input/output 306 may be connected to communications paths such as paths 116 and 136 (FIG. 1). Television programming, program schedule data, and other data (e.g., advertisement data, data indicating one or more television channels for which the display of an overlay is to be customized, etc.) may be received using input/output 306. Commands and requests and other data from the user may be transmitted over input/output 306.

Recording device 302 may contain at least one analog tuner for tuning to a desired analog television channel (e.g., to display video for a given television channel to a user, to receive program guide data and other data) and multiple tuners may be provided. Recording device 302 may also contain digital decoding circuitry for receiving digital television programming, music programming, program guide data, and other data on one or more digital channels. If desired, recording device 302 may contain circuitry for handling both analog and digital channels. Recording device 302 also contains a processor (e.g., a microcontroller or microprocessor or the like) that is used to execute software applications. Recording device 302 may contain memory such as random-access memory for use when executing applications. Nonvolatile memory may also be used to store a boot-up routine or other instructions. The hard disk and other storage in recording device 302 may be used to support databases (e.g., program guide databases or other interactive television application databases). The hard disk or other storage in recording device 302 may also be used to record video such as television programs or video-on-demand content or other content provided to recording device 302 over input/output 306.

Recording device 302 may have IR communications circuitry or other suitable communications circuitry for communicating with a remote control. Recording device 302 may also have dedicated buttons and a front-panel display. The front-panel display may, for example, be used to display the current channel to which the recording device is tuned.

Recording device 302 may also have communications circuitry such as a cable modem, an ISDN modem, a DSL modem, a telephone modem, or a wireless modem for communications with other equipment. Such communications may involve the Internet or other suitable communications networks or paths.

If desired, recording device 302 may include a satellite receiver or other equipment that has wireless communications circuitry for receiving satellite signals.

Recording device 302 of FIG. 3 or recording device 206 of FIG. 2 may record new video while previously recorded video is being played back on television 304 or 208. This allows users to press a pause button during normal television viewing. When the pause button is pressed, the current television program is stored on the hard disk of digital video recorder 302. When the user presses play, the recorded video may be played back. This arrangement allows the user to seamlessly pause and resume television viewing. Recording device 302 and 206 may also be used to allow a user to watch a previously-recorded program while simultaneously recording a new program.

The set-top box arrangement of FIG. 2 and the personal video recorder set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 204, recording device 302, a WebTV box, or PC/TV or the like may be integrated into a television or personal computer or other suitable device.

Figure 4:
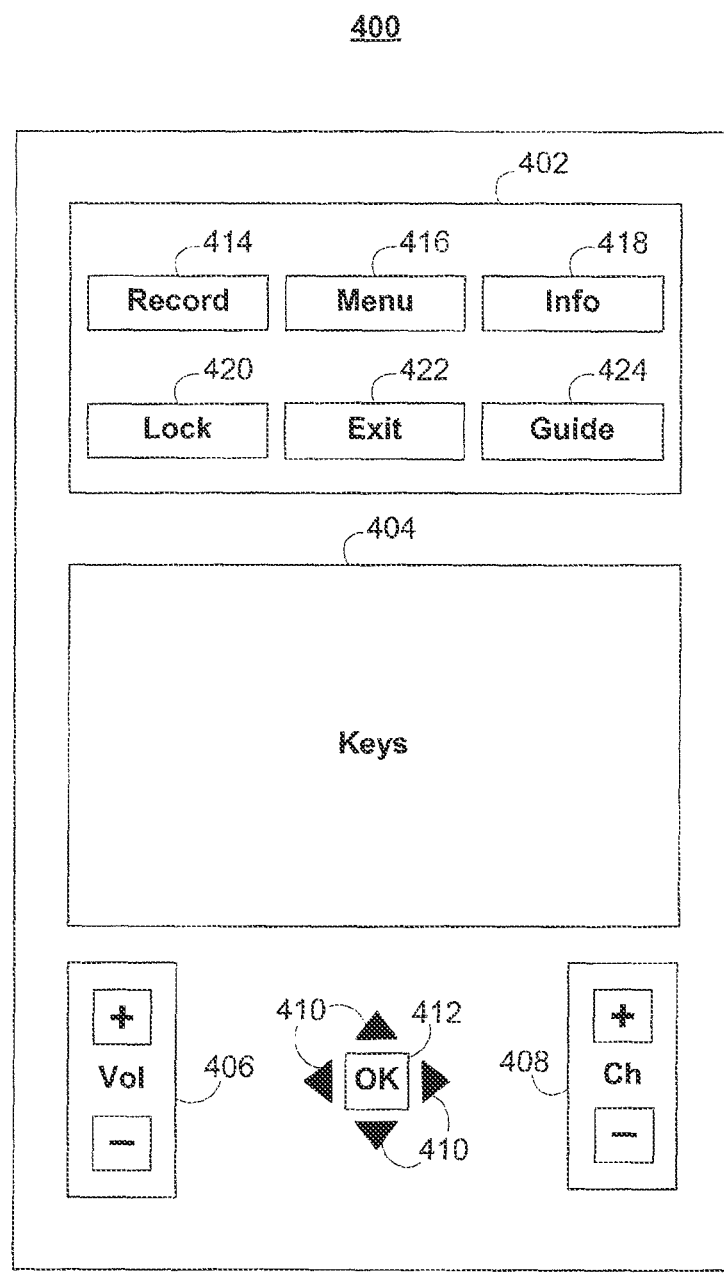
FIG. 4 is a diagram of an illustrative remote control in accordance with the present invention.

An illustrative remote control 400 for operating user television equipment 110 (FIG. 1) or suitable user computer equipment 112 is shown in FIG. 4. Remote control 400 is only illustrative and any other suitable user input interface may be used to operate user equipment (e.g., a mouse, trackball, keypad, keyboard, touch screen, voice recognition system, etc.). Remote control 400 may have function keys 402 and other keys 404 such as keypad keys, power on/off keys, pause, stop, fast-forward and reverse keys. Volume up and down keys 406 may be used for adjusting the volume of the audio portion of a video. Channel up and down keys 408 may be used to change television channels and to access content on virtual channels. Cursor keys 410 may be used to navigate on-screen menus. For example, cursor keys 410 may be used to position an on-screen cursor, indicator, or highlight (sometimes all generically referred to herein as a highlight or highlight region) to indicate interest in a particular option or other item on a display screen that is displayed by the interactive television application.

An OK key 412 (sometimes called a select or enter key) may be used to select on-screen options that the user has highlighted.

Keys 402 may include a RECORD key 414 for initiating recordings. MENU button 416 may be used to direct the interactive television application to display a menu on the user's display screen (e.g., on television 208 or 304 or on a suitable monitor or computer display). INFO button 418 may be used to direct the interactive television application to display an information display screen. For example, when a user presses INFO key 418 while video for a given television channel is displayed for the user, the interactive television application may display a FLIP overlay including program schedule information for the current program on the given television channel on top of the video. As another example, when a particular program listing in an interactive television program listings display screen is highlighted, the user pressing INFO button 418 may cause the interactive television application to provide additional program schedule information associated with that program 4 listing (e.g., a program description, actor information, etc.).

LOCK button 420 may be used to modify access privileges. For example, a parent may use LOCK button 420 or on-screen options to establish parental control settings for the interactive television application. The parental control settings may be time-based settings (e.g., to prevent a child from watching television during a particular time block such as from 3:00 PM to 5:00 PM). The parental control settings may also be used to block programming based on, for example, rating, channel, and program title. A locked or blocked program is typically not viewable until the interactive television application is provided with a suitable personal identification number (PIN). Once this PIN has been entered, the interactive television program will unlock the user's equipment and allow the locked content to be accessed.

EXIT button 422 may be used to exit the interactive television application or to exit a portion of the interactive television application (e.g., to cause the interactive television application to remove a FLIP, BROWSE, or other interactive television overlay from the display screen). GUIDE button 96 may be used to invoke an interactive television program guide (e.g., a program guide menu screen, program listings screen, or other program guide screen).

The keys shown in FIG. 4 are merely illustrative. Other keys or buttons may be provided if desired. For example, a music button may be used to access music with the interactive television application. An edit button may be used to edit stored content (e.g., to remove commercials, remove portions of a video, etc.). Alphanumeric buttons may be used to enter alphanumeric characters. A last or back button may be used to browse backward in the interactive television application (e.g., to return to a previous channel, web page, or other display screen). Video recorder function buttons such as a play button, pause button, stop button, rewind button, fast-forward button, and record button, may be used to control video recorder functions (local or network-based) in system 100 (FIG. 1). A help key may be used to invoke help functions such as context-sensitive on-screen help functions.

Figure 5:
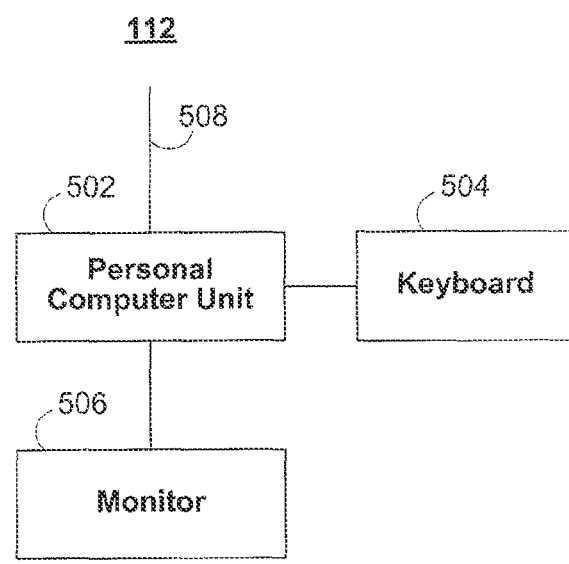
FIG. 5 is a diagram of illustrative user computer equipment in accordance with the present invention.

Illustrative user computer equipment 112 (FIG. 1) is shown in FIG. 5. In the arrangement of FIG. 5, personal computer 502 may be controlled by the user using keyboard 504 or other suitable user input device such as a trackball, mouse, touch pad, touch screen, voice recognition system, or a remote control such as remote control 400 of FIG. 4. Video content such as television programming and interactive television application display screens may be displayed on monitor 506. Television and music programming, program guide data, video-on-demand content, video recordings played back from a network-based video recorder, and other data may be received from paths 118 and 138 (FIG. 1) using input/output 508. User commands and other information generated as a result of user interactions with the interactive television application and system 100 (FIG. 1) may also be transmitted over input/output 508.

Personal computer unit 502 may contain a television or video card such as a television tuner card for decoding analog and digital television channels (e.g., channels comprising program guide data) and for handling streaming video content. Multiple video cards (e.g., tuner cards) may be provided if desired. An illustrative television tuner card that may be used may contain an analog television tuner for tuning to a given analog channel and digital decoding circuitry for filtering out a desired digital television or music channel from a packetized digital data stream. Any suitable card or components in computer unit 502 may be used to handle video and other content delivered via input/output line 508 if desired.

Personal computer unit 502 may contain one or more processors (e.g., microprocessors) that are used to run the interactive television application or a portion of the interactive television application.

Personal computer unit 502 may include a hard drive, DVD drive, CD drive, or other suitable storage device or devices that stores video, program guide data, and other content. The interactive television application and personal computer unit 502 may use a storage device or devices to, for example, provide the functions of a personal video recorder.

User equipment such as user equipment 108, user television equipment 110, and user computer equipment 112 may be used with network equipment such as server 130, server 140, and equipment at service providers such as service provider 142 of FIG. 1 to provide network-based video recording functions. Video recording functions may be provided by storing copies of television programs and other video content on a remote server (e.g., server 130 or server 140) or other network-based equipment such as equipment at a service provider such as service provider 142.

Video recordings may be made in response to user commands that are entered at user equipment 108. In a personal video recorder arrangement, the interactive television application may be used to record video locally on the user equipment in response to the user commands. In a network-based video recorder arrangement, the interactive television application may be used to record video or to make virtual recordings on network equipment such as server 130, server 140, or equipment at service provider 142 in response to the user commands. The user commends may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, system 100 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area. Personal settings or any other suitable data may be stored in a user's personal area on the network. For example, data associated with the display of interactive television overlays that have been customized by the user may be stored in such an area (e.g., to allow a back office of the interactive television application to determine which types of interactive television data are most desirable to users).

Figure 6:
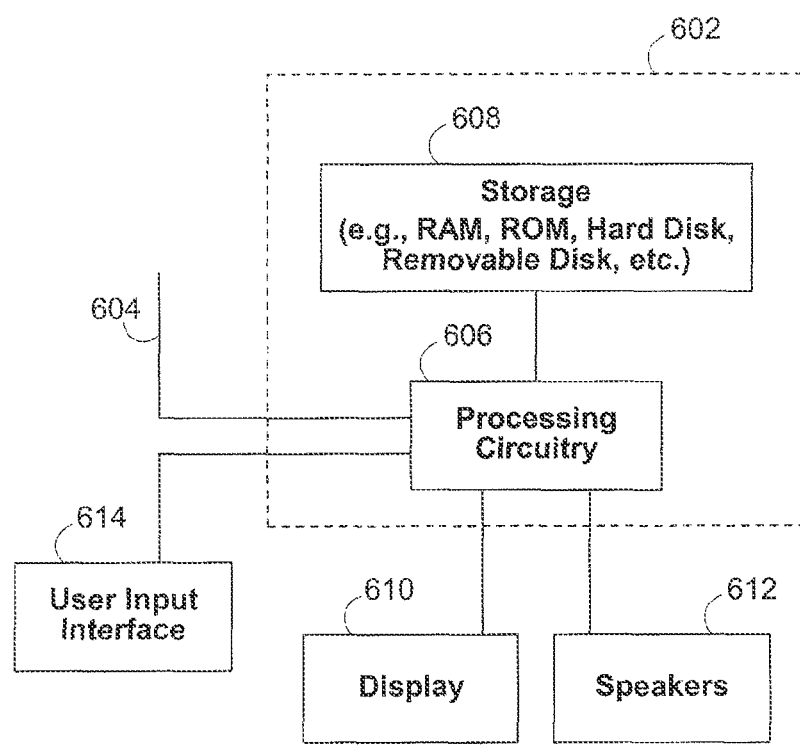
FIG. 6 is a generalized diagram of illustrative user equipment in accordance with the present invention.

The user television equipment and user computer equipment arrangements described above are merely illustrative. A more generalized embodiment of illustrative user equipment 108, 110, and 112 (FIG. 1) is shown in FIG. 6. Control circuitry 602 is connected to input/output 604. Input/output 604 may be connected to one or more communications paths such as paths 114, 116, 118, 128, 136, and 138 of FIG. 1. Television and music programming may be received via input/output 604 (e.g., from programming sources 102, servers or other equipment such as server 130, service providers such as service provider 142, television distribution facility 104, etc.). Program schedule information for an interactive television program guide may be received from data source 120 via input/output 604. Input/output 604 may also be used to receive data from data source 120 for other interactive television applications. The user may use control circuitry 602 to send commands, requests, and other suitable data using input/output 604.

Control circuitry 602 may be based on any suitable processing circuitry 606 such as processing circuitry based on one or more microprocessors, microcontrollers, digital signal processors, programmable logic devices, etc. Memory (e.g., random-access memory and read-only memory), hard drives, DVD drives, CD drives, or any other suitable memory or storage devices may be provided as storage 608 that is part of control circuitry 602. Tuning circuitry such as one or more analog tuners, one or more MPEG-2 decoders or other digital video circuitry, or any other suitable tuning or video circuits or combinations of such circuits may also be included as part of circuitry 602. Encoding circuitry (e.g., for converting over-the-air or cable analog signals to MPEG signals for storage) may also be provided. The tuning and encoding circuitry may be used by the user equipment to receive and display or play or record a particular television or music channel or other desired audio and video content (e.g., video-on-demand content or requested network-based or local video recorder playback). Television programming and other video and on-screen options and information may be displayed on display 610. Display 610 may be a monitor, a television, or any other suitable equipment for displaying visual images. Speakers 612 may be provided as part of a television or may be stand-alone units. Digital music and the audio component of videos displayed on display 610 may be played through speakers 612.

A user may control the control circuitry 602 using user input interface 614. User input interface 614 may be any suitable user interface, such as a mouse, trackball, keypad, keyboard, touch screen, touch pad, voice recognition interface, or a remote control.

The interactive television application of the present invention may use application data to change its display screens and available options. Such application data may originate from computers located at one or more suitable facilities or locations (e.g., television distribution facility 104 (FIG. 1), one or more data sources 120 (FIG. 1), a user input interface at user equipment, etc.). FIGS. 7, 8, and 10-18 show various interactive television application display screens in accordance with various embodiments of the present invention. The display screens of FIGS. 7, 8, and 10-18 are only illustrative. Any other suitable user interface approach may be used.

Figure 7:
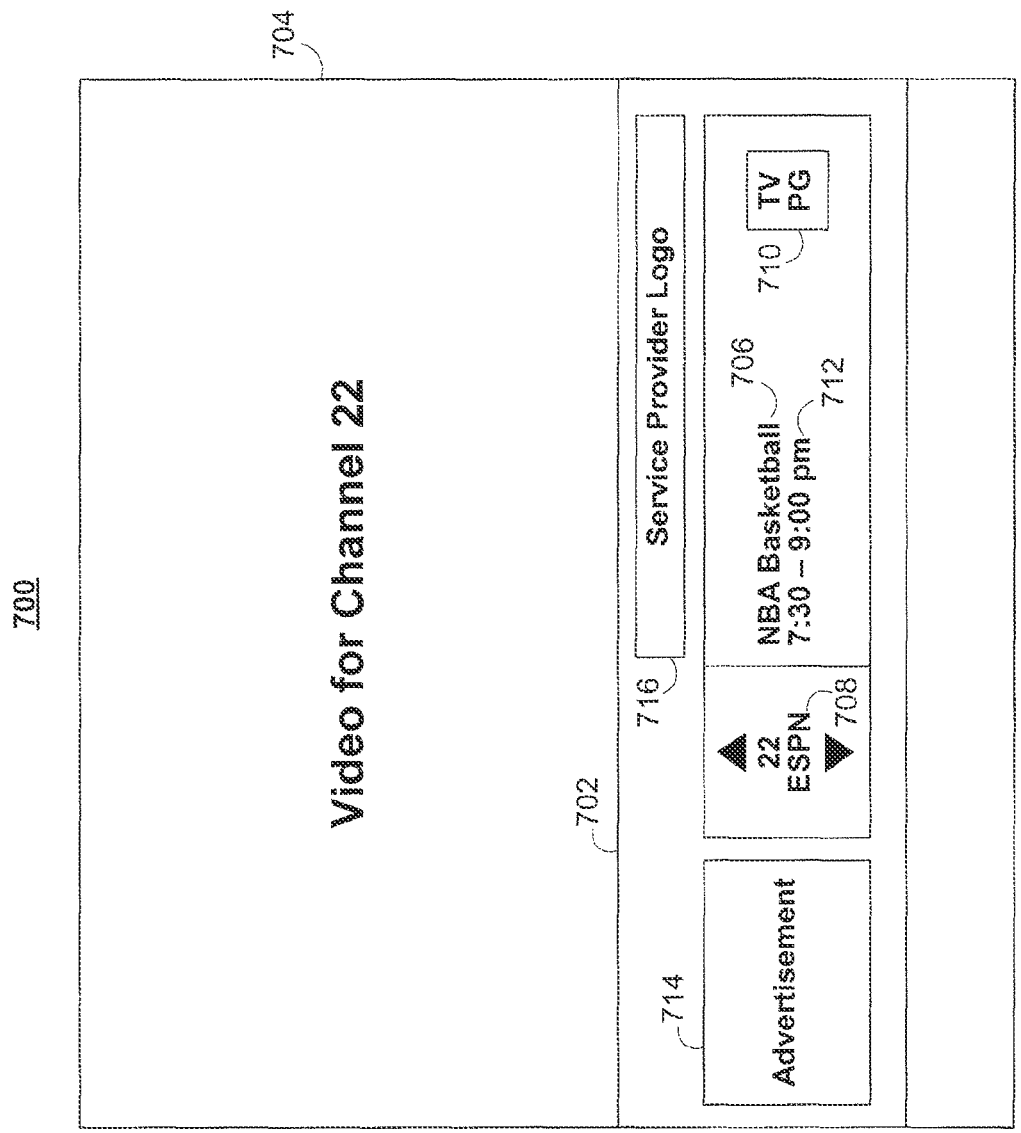
FIGS. 7 and 8 each show an illustrative FLIP overlay including information of a default set of information types that is displayed on top of video for a given television channel of a plurality of television channels in accordance with the present invention.

In some embodiments of the present invention, the interactive television application (e.g., an interactive television program guide) may display a FLIP overlay including information of a default set of information types on top of video for a given television channel. An information type is any suitable category of content that may be included in an interactive television overlay. A FLIP overlay generally includes one or more program schedule information types that are associated with the television program that is currently available for viewing by the user on the given television channel (e.g., a program title, program description, etc.). Any other suitable information types may also be included in the FLIP overlay (e.g., advertisements, service provider logos, web links, applets, etc.). An illustrative FLIP overlay display screen 700 is shown in FIG. 7. FLIP overlay 702 is displayed on top of video 704 for channel 22. Channel 22 may be one of a plurality of television channels for which the default set of FLIP information types applies. In particular, when a FLIP overlay is displayed on top of video for one of the plurality of television channels, the FLIP overlay may include information of the default set of information types. FLIP overlay 702 may include information of various default program schedule information types such as program title 706 for a television program that is currently available for viewing on channel 22, channel 708, rating 710, run time 712, or any other suitable information types (e.g., a description of the television program that is currently available for viewing by the user on channel 22). FLIP overlay 702 may also include information of other default information types such as advertisement 714, service provider logo 716 (e.g., for a service provider of the interactive television application, for a television broadcaster, etc.), and any other suitable information types (e.g., an internet link).

A given television channel may be identified as one of a plurality of television channels for which the default set of FLIP overlay information types applies in any suitable fashion. In some embodiments of the present invention, it may be determined that the default set of information types applies to the given television channel based on negotiations with the television broadcaster of the given television channel. The television broadcaster of the given television channel may, for example, indicate to a back-office representative of the interactive television application that information of the default set of information types is suitable for display on top of video for the one or more television channels that are associated with that broadcaster (e.g., channels HBO1 and HBO2 that are associated with broadcaster HBO). As another example, it may be determined that the default set of information types applies to one or more television channels absent a contrary request by the one or more television broadcasters of the one or more television channels or a contrary request by the user.

Figure 8:
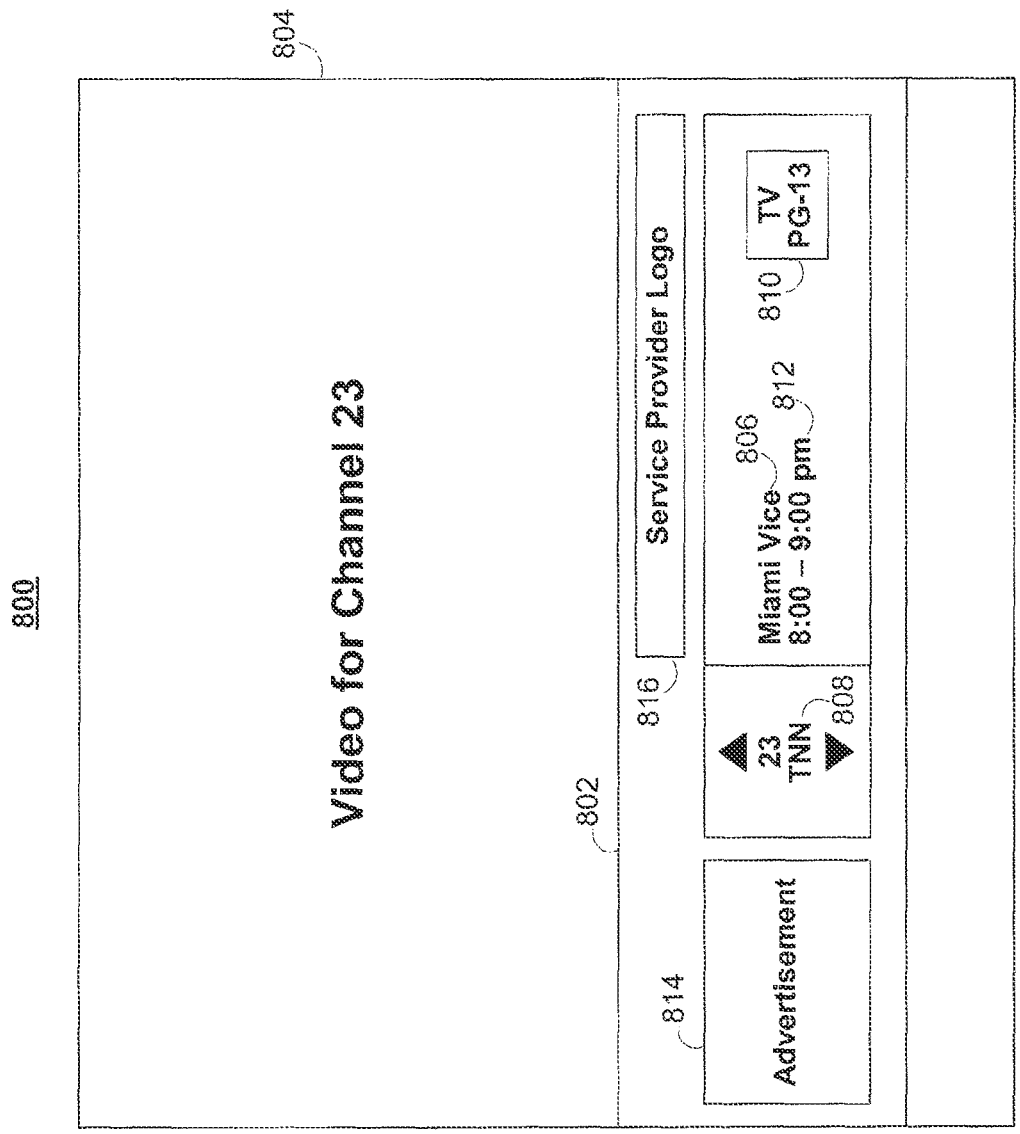

Another illustrative FLIP overlay display screen 800 is shown in FIG. 8. FLIP overlay 802 is displayed on top of video 804 for channel 23. Channel 23 may be another television channel of the plurality of television channels for which the default set of FLIP overlay information types applies. The interactive television program guide may display FLIP overlay 802 including information of the same default set of FLIP information types that are included in FLIP overlay 702 (FIG. 7) such as program title 806, channel 808, rating 810, run time 812, advertisement 814, and service provider logo 816. FLIP overlays for other channels of the plurality of television channels for which the default set of information types applies may also include information of the same default set of information types as FLIP overlays 702 (FIG. 7) and 802 (FIG. 8).

The interactive television application may display a FLIP overlay on top of video for a given television channel at any suitable time. For example, the interactive television application may automatically display a FLIP overlay on top of video for the given television channel in response to receiving a user indication to tune to the given television channel (e.g., a user pressing channel up/down keys 408 or the appropriate numeric keys 404). As another example, a FLIP overlay may be displayed on top of video for the given television channel in response to the interactive television application receiving a user indication to view program schedule information (e.g., a user pressing a remote control key such as INFO key 418) while video for the given television channel is displayed by user equipment. Still another example, a FLIP overlay may be displayed on top of video for the given television channel in response to the interactive television application receiving a user indication to exit other interactive television display screens (e.g., a program guide menu display screen, a program listings display screen, a display screen including a web page, etc.) when the given television channel is a currently tuned channel.

The interactive television application may display a FLIP overlay in any suitable format, size, and location in a display screen. For example, in the illustrative embodiments of FIGS. 7 and 8, FLIP overlays 702 and 802 are displayed in a banner-like format across bottom portions of display screens 700 and 800, respectively. In other examples, a FLIP overlay may be displayed in a different shape (e.g., an ovular shape), may occupy a greater or a lesser portion of the display screen, and may be displayed, for example, across a top portion of the display screen, a middle portion of the display screen, or along a side portion of the display screen. At least a substantial portion of the underlying video for the currently tuned program (e.g., video 704 or video 804) may be visible to the user while a FLIP overlay (e.g., FLIP overlay 702 or 802) or other interactive television overlay is displayed. In some embodiments of the present invention, a FLIP overlay that is displayed by the interactive television program guide may be at least somewhat transparent such that the underlying video can be at least partially perceived by the user through the overlay. In some embodiments of the present invention, the size of the video may be reduced so that it may be viewed unobscured at the same time as a FLIP display.

Figure 9:
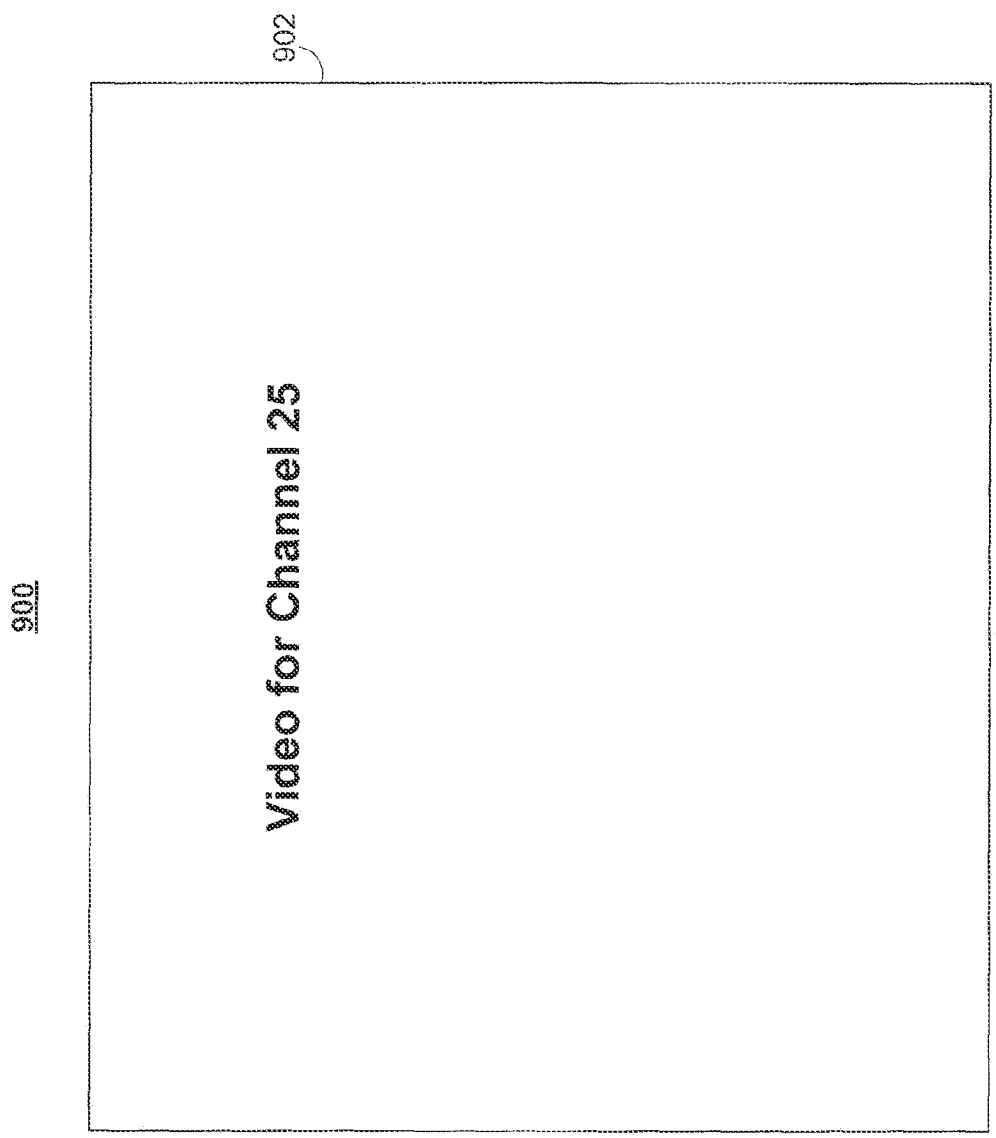
FIG. 9 shows a display screen that includes video for a particular television channel for which the display of an interactive television overlay is disabled in accordance with the present invention.

In accordance with the present invention, one or more television channels that are available for viewing by the user may be identified as television channels for which a default set of information types does not apply. The interactive television program guide may, for example, disable the display of a FLIP overlay on top of video for the one or more television channels. FIG. 9 shows an illustrative display screen 900 that may be displayed to the user in response to, for example, the interactive television program guide receiving a user indication to tune to television channel 25 for which the default set of information types does not apply. User equipment (e.g., user equipment 108, 110, 112 (FIG. 1)) may display video 902 for channel 25 in display screen 900. However, no FLIP overlay (e.g., such as FLIP overlay 702 (FIG. 7) or 802 (FIG. 8)) may be displayed in display screen 900.

In the example of FIG. 9, channel 25 may have been identified (e.g., by a back office of the interactive television application or a user) as a television channel for which the default set of information types does not apply based on, for example, negotiations with the television broadcaster for channel 25, data input using a suitable user input device such as remote control 400 (FIG. 4), or in any other suitable fashion. The display of a FLIP overlay on top of video for channel 25 may be disabled at all times or only in instances in which such a display would otherwise be automatic by the interactive television application (e.g., such as in response to a user indication to tune to channel 25). The television broadcaster for channel 25 may have, for example, requested that the FLIP overlay only be displayed on top of video 902 for channel 25 when the user expressly indicates a desire to view the FLIP overlay (e.g., when the user presses remote control INFO key 418 (FIG. 4) while video for channel 25 is displayed by user equipment, when the user enables the display of the FLIP overlay using one or more suitable user input interfaces, etc.).

The interactive television application may disable the functionality of various user input interface options that would otherwise cause the interactive television program guide to display a FLIP overlay on top of video for a given television channel. For example, while video is displayed on user equipment for a given television channel for which the default set of information types does not apply (e.g., video 902 (FIG. 9)), the functionality of remote control INFO key 418 which may otherwise cause the interactive television program guide to display a FLIP overlay (e.g., such as when the user presses INFO key 418 while video 704 (FIG. 7) or video 804 (FIG. 8) is displayed by user equipment) may be disabled.

Figure 10:
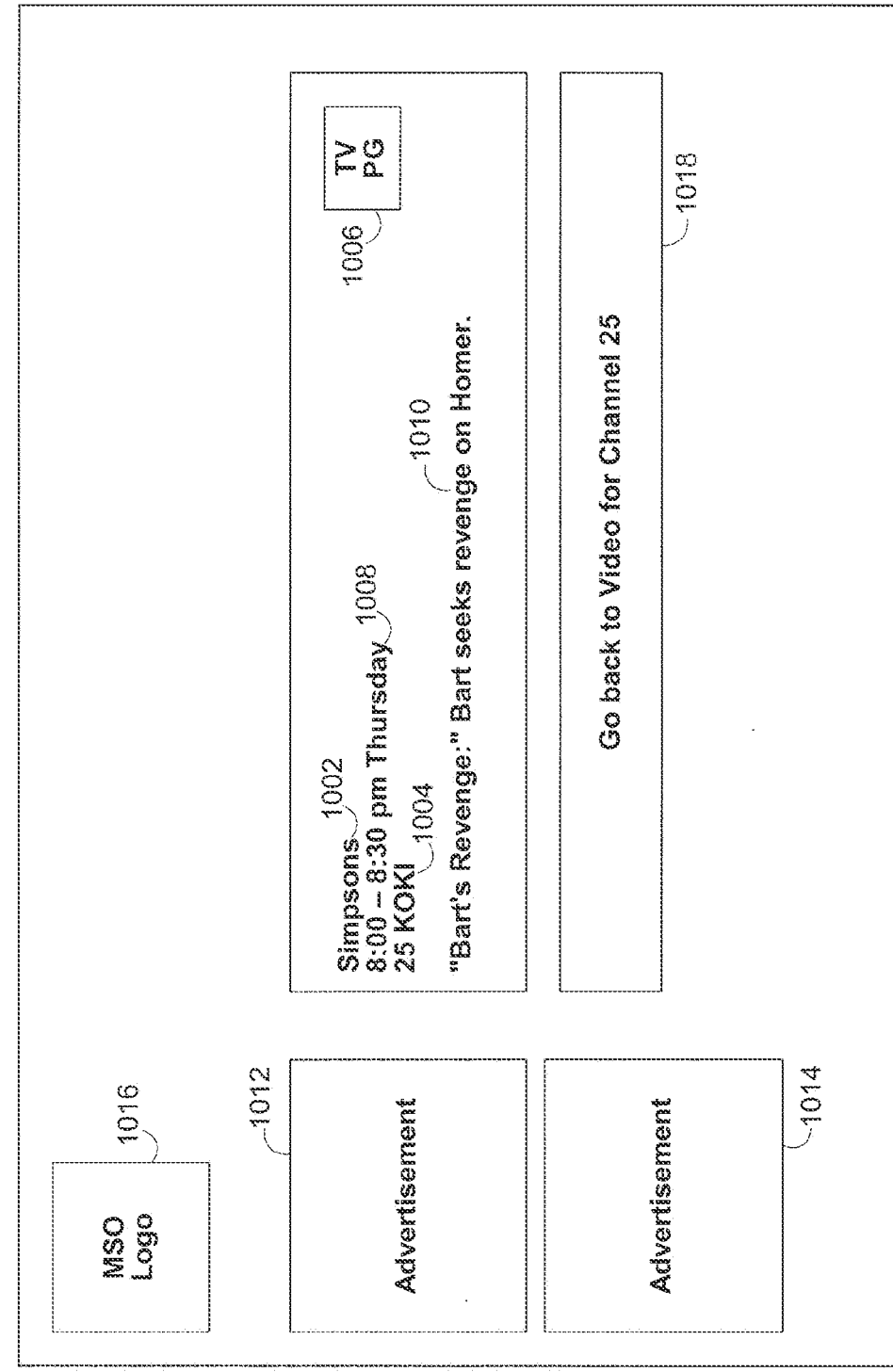
FIG. 10 shows an illustrative interactive television program schedule information display screen that may be displayed to a user in response to receiving a user indication to view program schedule information while video is displayed for a particular television channel for which the display of a FLIP overlay is disabled in accordance with the present invention.

The interactive television application may also modify the functionality of various user input interface options that may otherwise cause the interactive television program guide to display a FLIP overlay on top of video for a given television channel. FIG. 10 shows an illustrative interactive television application program schedule information display screen 1000. The interactive television application may display information display screen 1000 in response to, for example, receiving a user indication to view program schedule information (e.g., a user pressing remote control INFO key 418 (FIG. 4)) while video 902 (FIG. 9) for television channel 25 is displayed by user equipment. As previously described, channel 25 may be a television channel for which the display of a FLIP overlay is disabled. Information display screen 1000 may include one or more program schedule information types that may otherwise be included in a FLIP overlay such as program title 1002, channel 1004, rating 1006, run time 1008, and description 1010 of the program that is currently available for viewing by the user. However, information display screen 1000 may occupy the full area of the user's display screen (i.e., video for channel 25 may not be visible) and audio for television channel 25 may or may not be audible to the user while information display screen 1000 is displayed. In contrast, while video is displayed for a television channel for which the default set of FLIP overlay information types applies (e.g., video 702 (FIG. 7) for channel 22 or video 802 (FIG. 8) for channel 23), such a user indication may cause the interactive television program guide to display a FLIP overlay that only partially obstructs the underlying video and that does not affect the ability of the user to perceive the audio corresponding to the video. Information display screen 1000 may also include other suitable information types such as one or more advertisements 1012 and 1014, a service provider logo 1016, and any other suitable information types. The interactive television program guide may remove display screen 1000 and video for channel 25 may be displayed by user equipment in response to a user selection of option 1018 (e.g., a user positioning a highlight region on option 1018 using remote control keys 410 and pressing OK key 412 (FIG. 4)).

Figure 11:
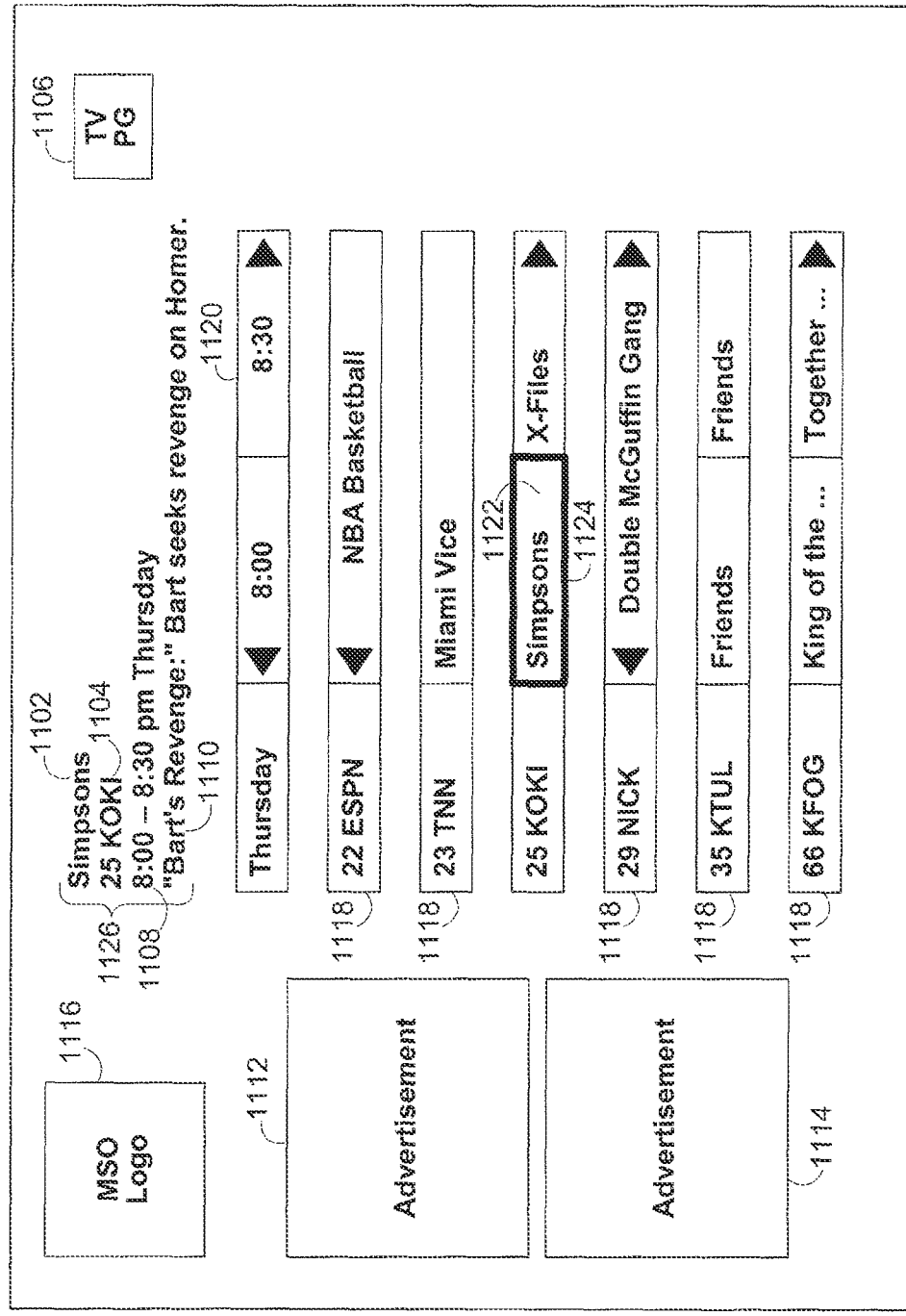
FIG. 11 shows an illustrative program listings display screen that may be displayed to a user in response to receiving a user indication to view program schedule information while video is displayed for a particular television channel for which the display of a FLIP overlay is disabled in accordance with the present invention.

FIG. 11 shows another illustrative interactive television program guide display screen 1100 that the interactive television program guide may display for a user in response to receiving, while television channel 25 for which the display of a FLIP overlay is disabled is a currently tuned channel, a user indication that would otherwise cause the interactive television program guide to display a FLIP overlay. Display screen 1100 is a program listings display screen that occupies the full area of the user's display (e.g., television 208 (FIG. 2), television 304 (FIG. 3), monitor 506 (FIG. 5), display 610 (FIG. 6), etc.). Audio for television channel 25 may or may not be audible to the user while program listings display screen 1100 is displayed by user equipment. Similar to information types that may otherwise be included in a FLIP overlay, display screen 1100 may include the program schedule information types of program title 1102, channel 1104, rating 1106, run time 1108, and description 1110 for the television program that is currently available for viewing on channel 25. Program listings display screen 1100 may also include other information such as one or more advertisements 1112 and 1114, a service provider logo 1116 (e.g., an MSO logo), and program schedule information for other channels (e.g., channels 1118) and times (e.g., time slot 1120 from 8:30-9:00 PM). The interactive television-program guide may initially display program listings display screen 1100 having the currently broadcasted program 1122 on channel 25 highlighted by highlight region 1124 such that detailed information 1126 for program 1122 is displayed for the user. The user may change the position of highlight region 1124 using, for example, remote control 400 (FIG. 4) or other user input interface (e.g., user input interface 614 (FIG. 6)) to view detailed information 1126 for programs other than program 1122.

Information display screen 1000 of FIG. 10 and program listings display screen 1100 of FIG. 11 are only illustrative. Any other suitable interactive television display screens may be displayed by the interactive television application in response to receiving a user indication that would otherwise cause a FLIP overlay to be displayed on top of video for a given television channel for which the display of a FLIP overlay is disabled. For example, the interactive television program guide may display a main menu display screen that includes various interactive television options and features (e.g., an option to access an information display screen such as display screen 1000 (FIG. 10), an option to access a program listings display screen such as display screen 1100 (FIG. 11), an option to access a home shopping or banking display screen, etc.) or any other suitable display screen in response to receiving such a user indication.

Figure 12:
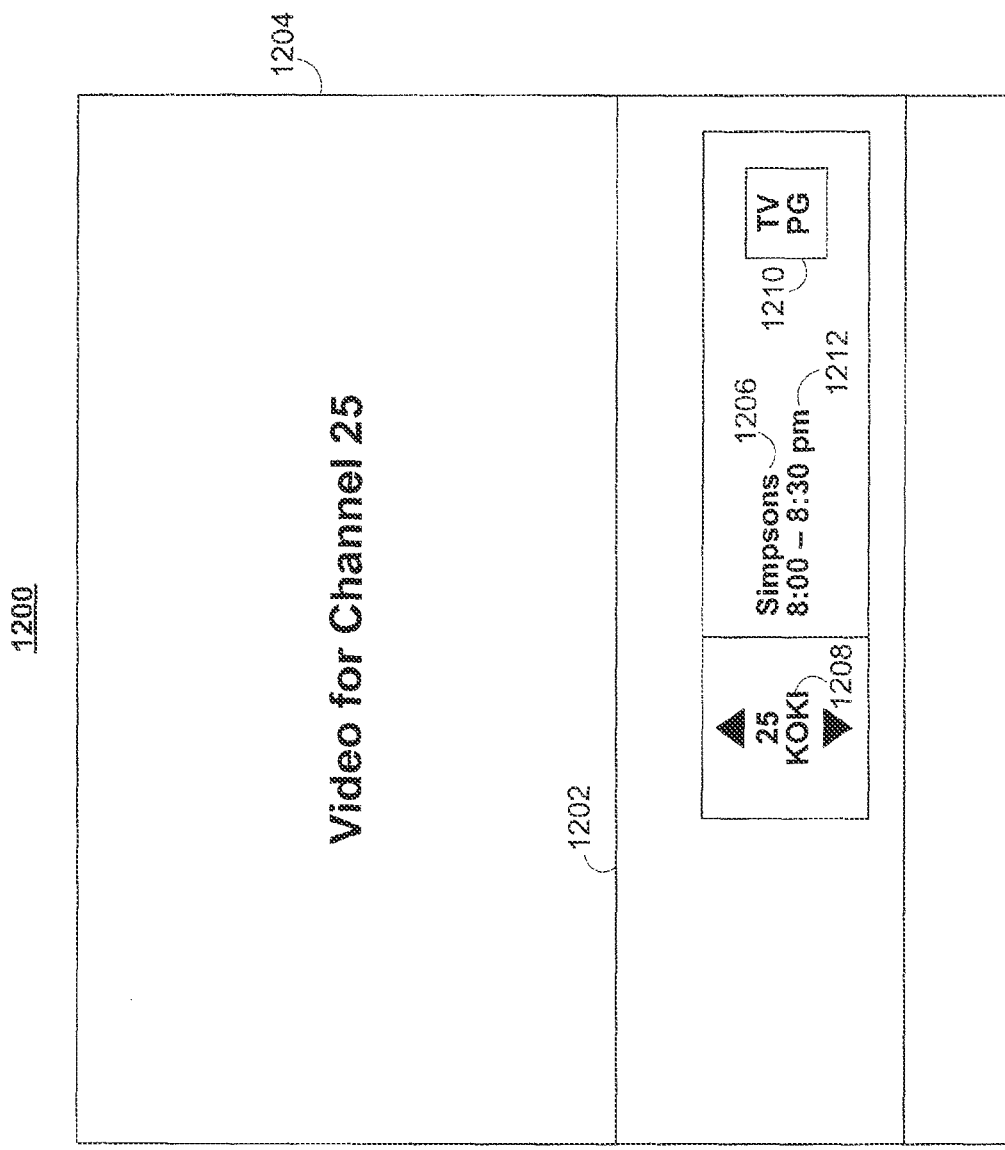
FIG. 12 shows an illustrative customized FLIP overlay that is displayed on top of video for a particular television channel and that includes less than all information types of the default set of FLIP information types in accordance with the present invention.

In some embodiments of the present invention, the interactive television application may display a FLIP overlay including information of a custom set of information types on top of video for a given television channel. An illustrative FLIP overlay display screen 1200 is shown in FIG. 12. FLIP overlay 1202 is displayed on top of video 1204 for television channel 25 which, as previously described, may be a television channel for which the default set of FLIP information types does not apply (e.g., as determined based on negotiations with the television broadcaster for television 25 or based on one or more user inputs). The custom set of information types of FLIP overlay 1202 may include less than all information types of the default set of FLIP overlay information types (e.g., less than all information types that are displayed in FLIP overlays 702 (FIG. 7) and 802 (FIG. 8)). For example, FLIP overlay 1202 may include information of the program schedule information types of program title 1206, channel 1208, rating 1210, and run time 1212, but not information of the information types of an advertisement (e.g., such as advertisement 714 (FIG. 7) or 814 (FIG. 8)) and a service provider logo (e.g., such as logo 716 (FIG. 7) or 816 (FIG. 8)). The television broadcaster for channel 25 may have, for example, requested that FLIP overlay 1202 for channel not include these information types unless requested or enabled by the user (e.g., the interactive television application compiling viewer statistics indicating a desire to view advertisements and a service provider logo).

Referring to FIGS. 7, 8, and 12, the interactive television application may display information of information types that are common to both the default and custom sets of FLIP overlay information types in the same locations and formats in the associated FLIP overlays. This may, for example, maximize the ability of the user to locate various information in the FLIP overlays as the user changes channels and the associated FLIP overlays are displayed.

Figure 13:
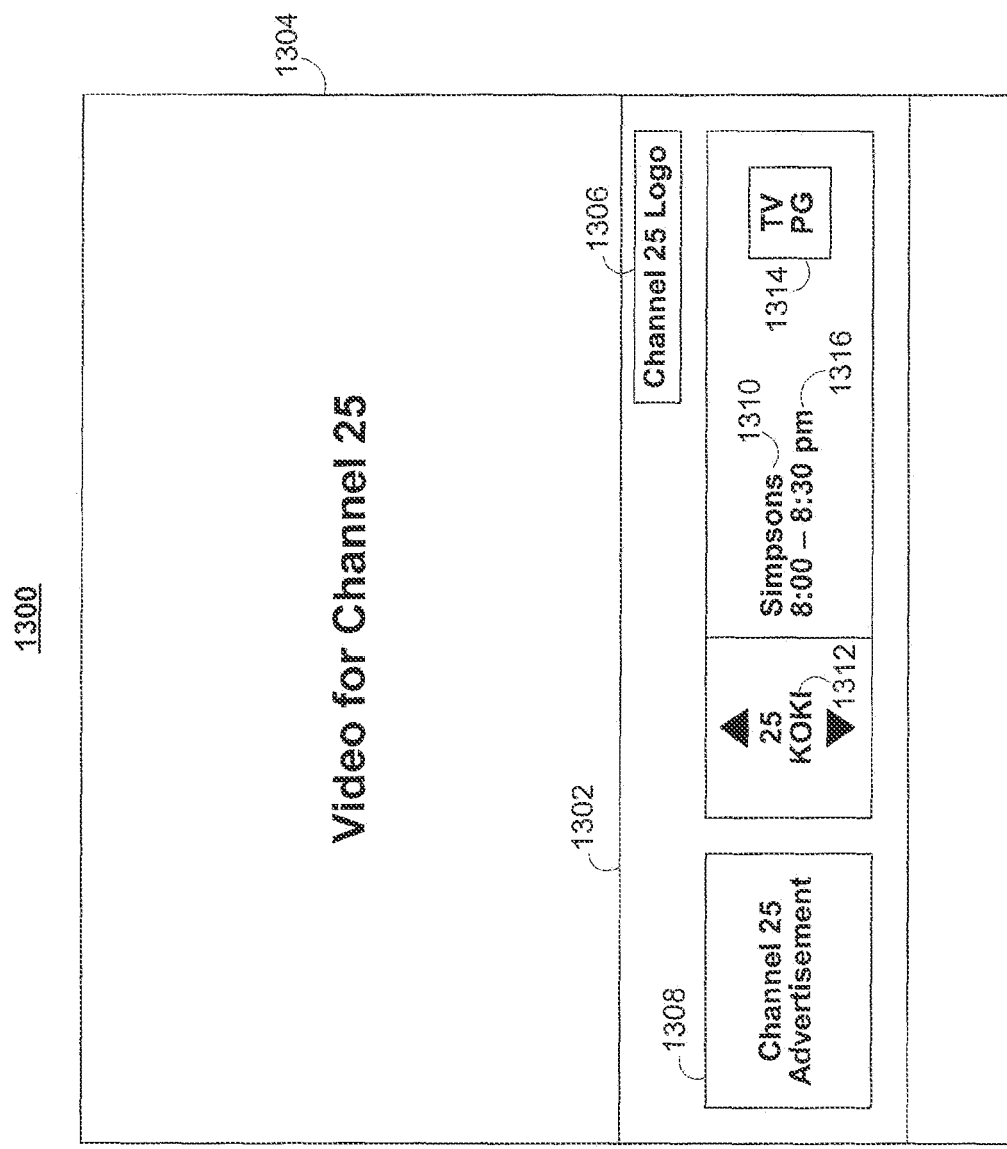
FIG. 13 shows an illustrative customized FLIP overlay that is displayed on top of video for a particular television channel and that includes information of one or more information types that are not included in the default set of FLIP information types in accordance with the present invention.

In some embodiments of the present invention, a custom set of FLIP overlay information types may include one or more information types that is not included in the default set of FLIP overlay information types. FIG. 13 shows an illustrative FLIP overlay display screen 1300. FLIP overlay 1302 is displayed on top of video 1304 for channel 25 which, as previously described, may be a television channel for which the default set of information types does not apply. The custom set of information types for FLIP overlay 1302 may include various information types that are not included in the default set of FLIP overlay information types (e.g., as shown in FIGS. 7 and 8) such as logo 1306 for channel 25 and advertisement 1308 that is associated with channel 25 (e.g., an advertisement for a future program on channel 25 or other television channel having the same television broadcaster as channel 25, an advertisement for a product that is being offered by the television broadcaster of channel 25, etc.). The television broadcaster for television channel 25 may have, for example, requested that FLIP overlay 1302 only include information that is associated with channel 25 (e.g., or another television channel that has the same television broadcaster). In other examples, a FLIP overlay such as FLIP overlay 1302 may be customized so as to replace advertising information types of the default set of information types (e.g., advertisement 714 (FIG. 7)) with non-advertising information types (e.g., a program description). Logo 1306 and advertisement 1308 or other information types that are not included in the default set of information types may be positioned and formatted in FLIP overlay 1302 so as to minimize differences in the look and feel of overlay 1302 with, for example, overlay 702 of FIG. 7 for which the default set of information types applies. The custom set of information types for FLIP overlay 1302 may also include various information types that are included in the default set of FLIP overlay information types such as program title 1310, channel 1312, rating 1314, and program run time 1316.

Figure 14:
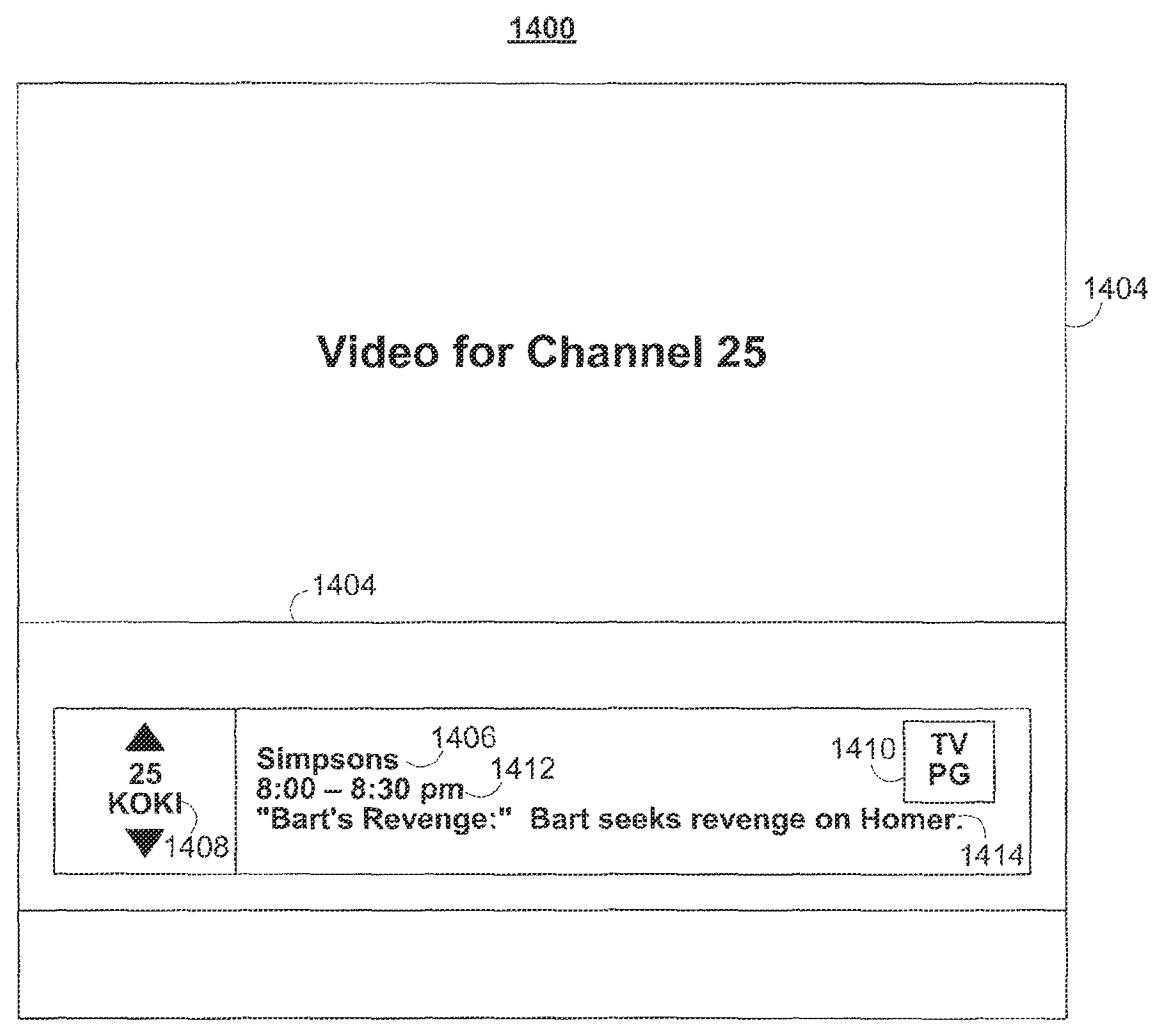

FIG. 14-shows another illustrative FLIP overlay display screen 1400. Customized FLIP overlay 1402 may be displayed on top of video 1404 for television channel 25 which as previously described, may be a television channel for which the default set of FLIP information types does not apply. Similar to illustrative FLIP overlay 1202 of FIG. 12, the custom set of information types of FLIP overlay 1402 may include less than all information types of the default set of information types. For example, FLIP overlay 1402 may include information of the program schedule information types of program title 1406, channel 1408, rating 1410, and run time 1412, but not information of the information types of an advertisement and a service provider logo. Information of the custom set of information types of FLIP overlay 1402 may be repositioned and reformatted relative to information of the same information types of the default set of FLIP information types (e.g., as shown in FLIP overlay 702 (FIG. 7)). For example, information of the program schedule information type of channel 1408 may be repositioned to the left edge of FLIP overlay 1402 to compensate for the act that an advertisement (e.g., such as advertisement 714 (FIG. 7)) is not included in FLIP overlay 1402. This may prevent FLIP overlay 1402 from having empty space when FLIP overlay 1402 includes less than all information types of the default set of information types. The custom set of information types of FLIP overlay 1402 may also include information types that are not included in the default set of information types. For example, FLIP overlay 1402 may include information of the program schedule information type of program description 1414.

The customized FLIP overlays of FIGS. 12-14 are only illustrative. FLIP overlays may be customized in any other suitable fashion. In some embodiments of the present invention, a different custom set of FLIP information types may be displayed in a FLIP overlay for each television channel for which the default set of FLIP information types does not apply. In some embodiments of the present invention, a single custom set of FLIP overlay information types (e.g., a custom set of information types that excludes one or both of an advertisement and a service provider logo) may be applicable to every television channel for which the default set of FLIP information types does not apply. In some embodiments of the present invention, the interactive television program guide may display one or more custom sets of FLIP overlay information types in FLIP overlays on top of video for a first group of television channels and may disable the display of a FLIP overlay on top of video for a second group of television channels. In some embodiments of the present invention, the display of a FLIP overlay may be customized for every television channel that is available for viewing by the user and there may be no default set of FLIP information types (e.g., a different set of FLIP overlay information types being applicable to each television channel).

In some embodiments of the present invention, the interactive television application may customize only the display of the FLIP overlay on top of video for a given television channel. All other interactive television overlays that are displayed on top of video for the given television channel may include, for example, a global set of information types that is applicable to every television channel that is available for viewing by the user.

In some embodiments of the present invention, the display of one or more interactive television overlays other than the FLIP overlay may be customized (e.g., in addition to customizing the FLIP overlay). For example, the display of a BROWSE overlay on top of video for a given television channel may be customized. Such a BROWSE overlay generally includes program schedule information that is associated with at least one program other than the program that is currently available for viewing by the user on the given television channel. The BROWSE overlay may include any other suitable information (e.g., advertisements, service provider logos, web links, applets, etc.). Any other interactive television overlay that is displayed on top of video for a television channel may be customized in accordance with the present invention. For example, a reminder overlay including information associated with a program that the user scheduled for reminding, a record overlay including information associated with a program that the user scheduled for recording, or any other interactive television overlays such as a home banking overlay or a home shopping overlay may be customized. As another example, one or more interactive television overlays that would otherwise be displayed on top of video for a particular channel may be customized (e.g., disabled) to, for example, prevent advertising content from being displayed simultaneously with video for the particular channel.

Figure 15:
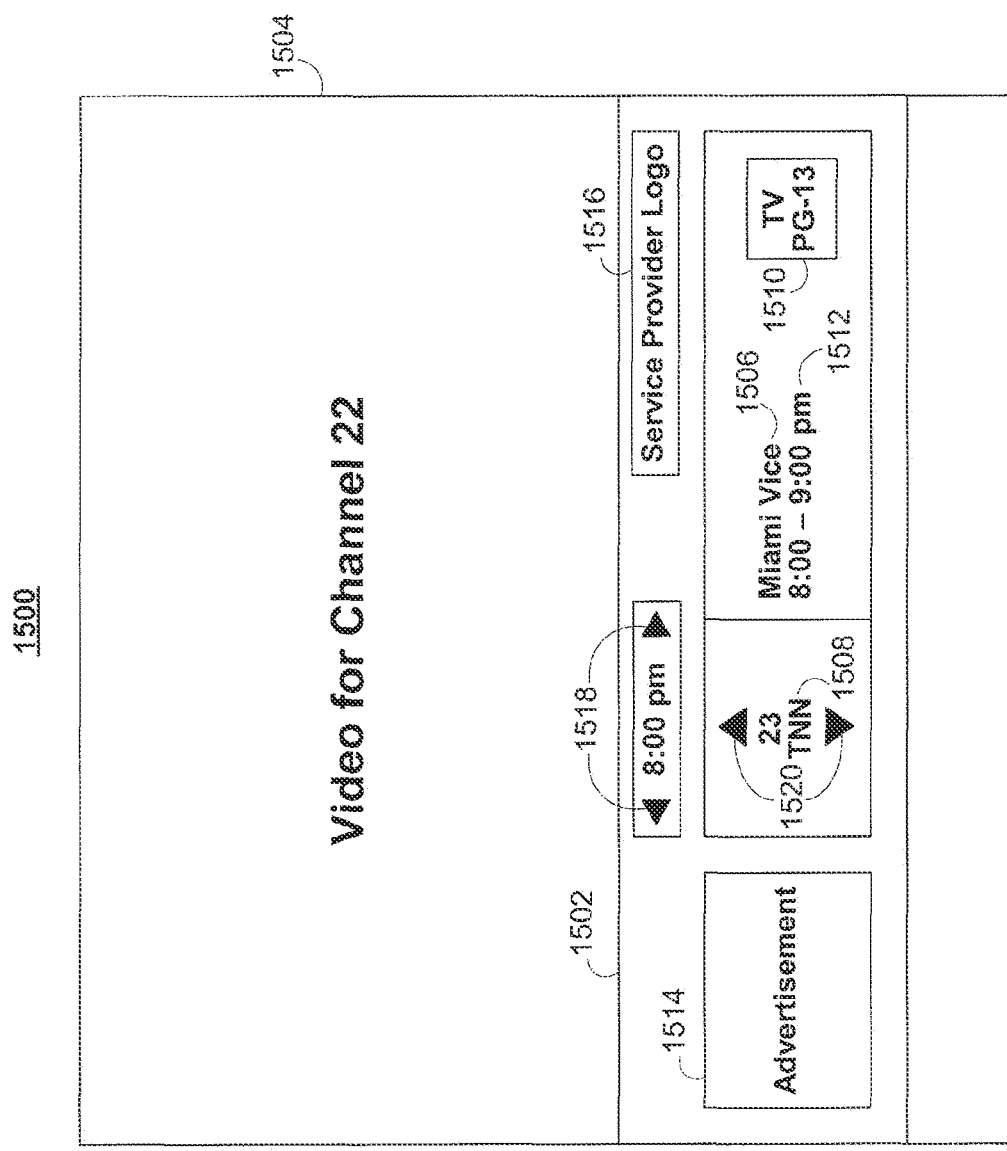
FIG. 15 shows an illustrative BROWSE overlay including information of a default set of information types that is displayed on top of video for a given television channel of a plurality of television channels in accordance with the present invention.

FIG. 15 shows an illustrative BROWSE overlay display screen 1500 in accordance with the present invention. BROWSE overlay 1502 is displayed on top of video 1504 for television channel 22. Channel 22 may be one of a plurality of television channels for which a default set of BROWSE information types applies (e.g., as determined based on negotiations with the television broadcaster for channel 22). In particular, the BROWSE overlay that is displayed on top of video for one of the plurality of television channels may include information of the default set of BROWSE information types. BROWSE overlay 1502 may include program schedule information of various default information types such as one or more program titles 1506 for one or more television programs other than the program that is currently broadcasted on channel 22, channel 1508, rating 1510, run time 1512, or any other suitable information types (e.g., a program description). BROWSE overlay 1502 may also include information of other default information types such as advertisement 1514, service provider logo 1516 (e.g., for a service provider that provides program schedule information, for a television broadcaster, etc.), and any other suitable information types (e.g., an internet link). The user may change the one or more channels and the time range for which program schedule information is displayed in BROWSE overlay 1502 without removing the display of the video for channel 22 by selecting channel up/down options 1518 and time last/next options 1520 or by pressing the arrow keys 410 on remote control 400 (FIG. 4).

The interactive television application may display a BROWSE overlay at any suitable time. For example, BROWSE overlay 1502 may be displayed in response to the interactive television application receiving a user indication to view the BROWSE overlay (e.g., a user pressing remote control arrow keys 410 (FIG. 4) while a FLIP overlay is displayed or while watching television, a user selecting a BROWSE option from an on-screen menu, a user pressing a remote control BROWSE key from keys 404, etc.). As another example, BROWSE overlay 1502 may be displayed automatically by the interactive television program guide in response to, for example, the user exiting another interactive television display screen when channel 22 is a currently tuned channel.

The display of a BROWSE overlay may be customized in any suitable fashion in accordance with the present invention. For example, when the display of a FLIP overlay on top of video for a given television channel is customized in accordance with the present invention, the display of a BROWSE overlay on top of video for the given television channel may be similarly customized. The interactive television application may, for example, disable the display of a BROWSE overlay on top of video for the given television channel (e.g., television channel 25 or other channel for which the default set of BROWSE information types does not apply). A display screen such as display screen 900 (FIG. 9) that includes only video for the given television channel may be displayed to the user in response to receiving a user indication that would otherwise cause the interactive television application to display the BROWSE overlay. As another example, while video for the given television channel is displayed by user equipment, the interactive television application may prevent the BROWSE overlay from being displayed on top of video for the given television channel by disabling or modifying the functionality of various user input interface functions that would otherwise cause the BROWSE overlay to be displayed. The interactive television application may, for example, display one or more full-screen interactive television display screens such as information display screen 1000 (FIG. 10) or program listings display screen 1100 (FIG. 11) in response to receiving a user indication of one or more of the user input interface functions.

Figure 16:
FIG. 16 shows an illustrative customized BROWSE overlay that is displayed on top of video for a particular television channel and that includes less than all information types of the default set of BROWSE information types in accordance with the present invention.

In some embodiments of the present invention, the interactive television program guide may display a BROWSE overlay including information of a custom set of information types on top of video for a television channel. An illustrative BROWSE overlay display screen 1600 is shown in FIG. 16. BROWSE overlay 1602 is displayed on top of video 1604 for television channel 25 which may be a television channel for which the default set of BROWSE information types does not apply (e.g., as determined based on negotiations with the television broadcaster for channel 25, based on user inputs using remote control 400 (FIG. 4), based on the default set of FLIP overlay information types or other default set of overlay information types not being applicable to channel 25, etc.). The custom set of information types for BROWSE overlay 1602 may include less than all information types of the default set of BROWSE overlay information types (e.g., less than all information types that are displayed in BROWSE overlay 1502 (FIG. 15)). For example, the custom set of information types of BROWSE overlay 1602 may include the program schedule information types of program title 1606, channel 1608, rating 1610, and run time 1612, but not the information types of an advertisement (e.g., such as advertisement 1514 (FIG. 15)) and a service provider logo (e.g., such as logo 1516). The television broadcaster for channel 25 may have, for example, requested that BROWSE overlay 1602 not include these information types. A user may select channel up and down options 1614 and time last and next options 1616 to change the one or more channels and the time range for which program schedule information is displayed in BROWSE overlay 1602 without removing video for channel 25 from the display. In other examples, a customized BROWSE overlay such as overlay 1602 may allow the user to view only program schedule information for one or more programs that are to be broadcast on the currently tuned channel, on a channel having the same television broadcaster, or both (e.g., in response to the television broadcaster of the currently tuned channel requesting that the BROWSE overlay not include program schedule information that is associated with other television broadcasters).

Referring to FIGS. 15 and 16, the interactive television application may display information of information types that are common to both the default and custom sets of BROWSE overlay information types (e.g., rating (1510, 1610)) in the same position and, format in the associated BROWSE overlays. This may streamline the look and feel of the default and customized BROWSE overlays for the user and may allow the user to more easily locate information in the overlays. In other embodiments of the present invention, information of information types that are, common to both the default and custom sets of BROWSE overlay information types may be displayed in different locations and formats in the associated BROWSE overlays to, for example, compensate for open space where one of the sets includes a greater number of information types than the other set of information types.

Figure 17:
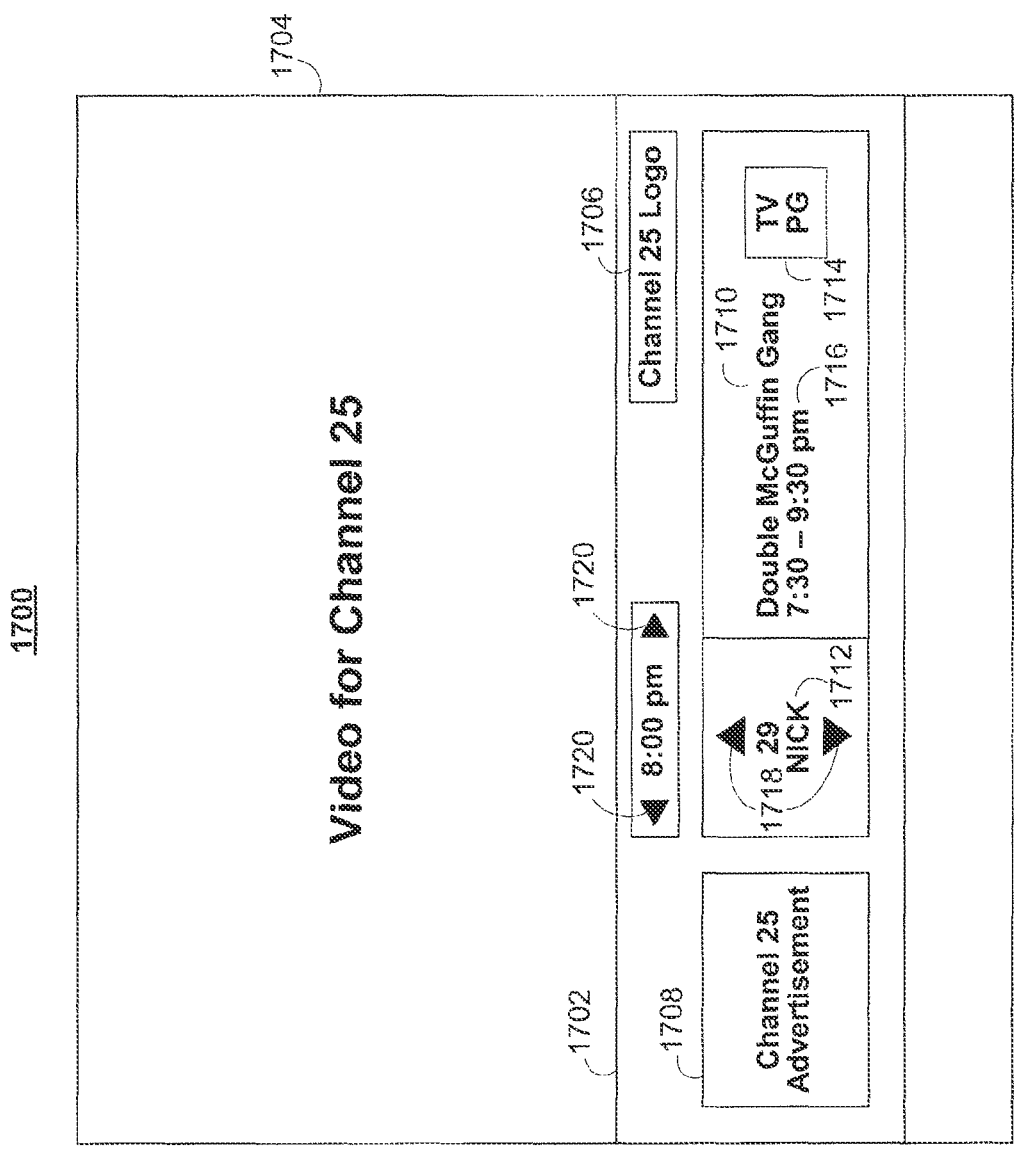
FIG. 17 shows an illustrative customized BROWSE overlay that is displayed on top of video for a particular television channel that includes one or more information types that are not included in the default set of BROWSE information types in accordance with the present invention.

In some embodiments of the present invention, a custom set of BROWSE information types may include one or more information types that is not included in the default set of BROWSE overlay information types. FIG. 17 shows an illustrative BROWSE overlay display screen 1700. BROWSE overlay 1702 is displayed on top of video 1704 for channel 25 which, as previously described, may be a television channel for which the default set of BROWSE information types does not apply. The custom set of information types of BROWSE overlay 1702 may include various information types that are not included in the default set of BROWSE overlay information types (e.g., as shown in FIG. 15) such as logo 1706 for channel 25 and advertisement 1708 that is associated with channel 25 (e.g., an advertisement for a future program on channel 25 or other television channel having the same television broadcaster as channel 25, an advertisement for a product that is being offered by the television broadcaster of channel 25, etc.). Any other suitable information types may be included in the custom set of BROWSE information types (e.g., a program description). The television broadcaster for television channel 25 may have, for example, requested that BROWSE overlay 1702 include only information that is associated with channel 25. The custom set of information types for BROWSE overlay 1702 may also include various information types that are included in the default set of BROWSE overlay information types such as program title 1710, channel 1712, rating 1714, and program run time 1716. A user may select channel up and down options 1718 and time last and next options 1720 to change the one or more channels and the time range for which program schedule information is displayed in BROWSE overlay 1702 without removing video for channel 25 from the display.

Figure 18:
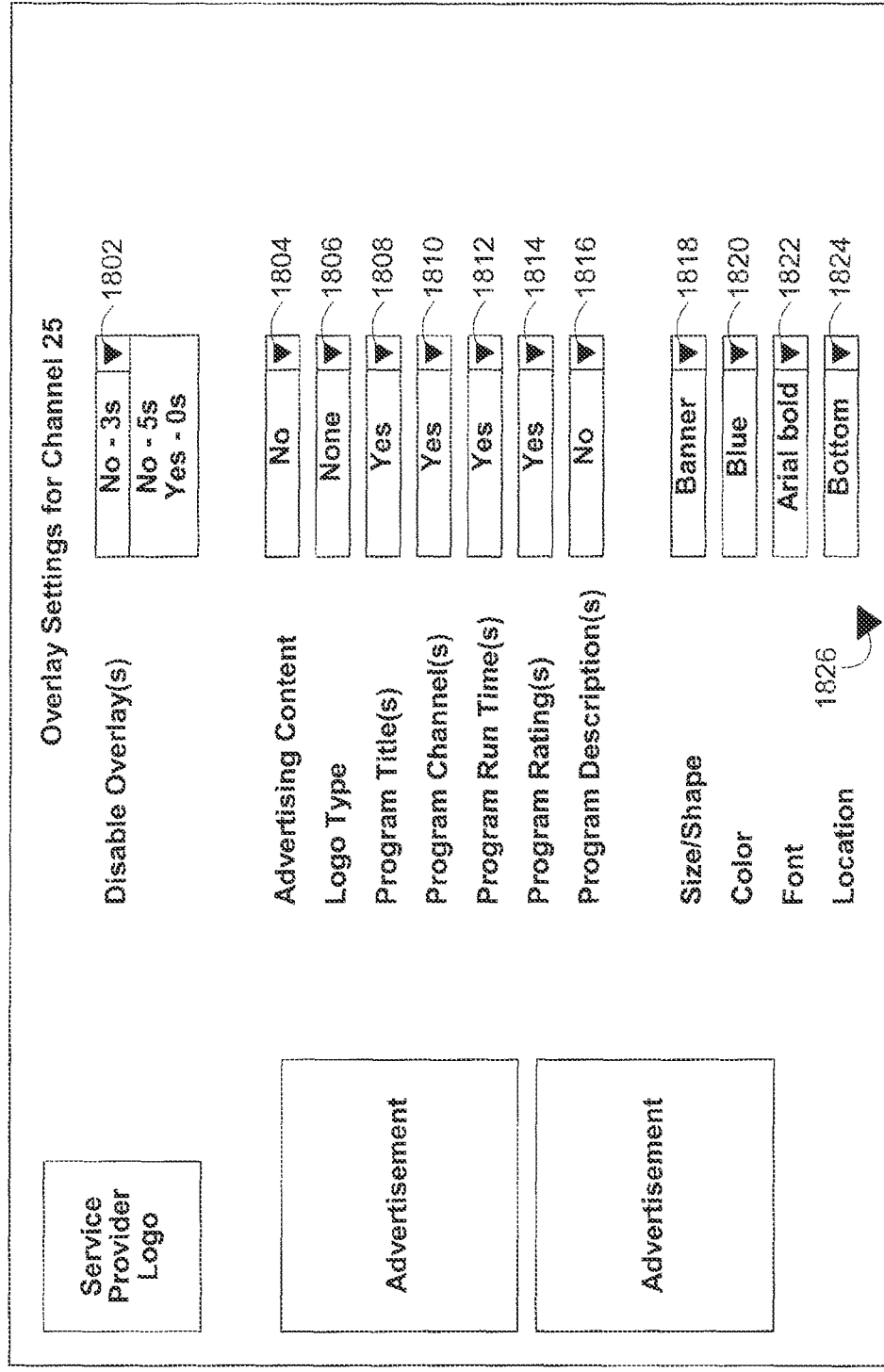
FIG. 18 shows an illustrative overlay settings display screen that may include various user-selectable options for customizing the display of interactive television overlays in accordance with the present invention.

In some embodiments of the present invention, the interactive television application may allow the user to customize various conditions related to the display of a FLIP overlay, BROWSE overlay, or any other suitable interactive television overlays on top of video for a given television channel. FIG. 18 shows an illustrative overlay settings display screen 1800. Overlay settings display screen 1800 may include various user-selectable options for customizing the display of interactive television overlays. For example, overlay settings display screen may include option 1802 to disable the display of interactive television overlays or to adjust the length of time for which the overlays are displayed (e.g., 3 seconds or 5 seconds), option 1804 to customize the types of advertising content included in the overlays, and option 1806 to customize the types of logos included in the overlays (e.g., a logo for a television broadcaster, a logo for interactive television service provider, etc.). Another example is that display screen 1800 may include an option to view video (e.g., video for the television program on top of which the overlay may otherwise be displayed or video for other television programs or promotional clips) in a reduced size video window simultaneously with one or more types of interactive television displays (e.g., a FLIP display). Overlay settings display screen 1800 may also include various user-selectable options for customizing the types of program schedule information that is included in the interactive television overlays such as option 1808 associated with the display of program titles, option 1810 associated with the display of program channels, option 1812 associated with the display of program run times, option 1814 associated with the display of program ratings, and option 1816 associated with the display of program descriptions. The user may also be able to customize other display conditions using other user-selectable options such as option 1818 associated with the size or shape of the overlays (e.g., a banner-like shape, an ovular shape, occupying one quarter of the user's display screen, occupying one third of the user's display, etc.), option 1820 associated with the color of the overlays, option 1822 associated with the font of the overlays, and option 1824 associated with the location of the overlays. The interactive television program guide may display any other suitable user-selectable options associated with the display of interactive television overlays in response to receiving a user selection of option 1826.

Display screen 1800 may apply to all overlay types (e.g., FLIP, BROWSE, etc.). Alternatively, there may be separate similar screens that can be used to customize the display of different overlay types. The application may not allow all types of overlays to be customized by the user. Furthermore, the application may or may not allow some or all of the options (which may have been customized in accordance with the wishes of a broadcaster) to be overridden by the user. This may be true in general (e.g., the user may never or always be allowed to disable the display of advertisements) or only fore a specific channel or set of channels (e.g., a broadcaster may wish to prevent the user from enabling the FLIP overlay on a specific channel for which the broadcaster has disabled it). The user may be allowed to change the set of default configurations that apply to all channels not individually configured.

In the example of FIG. 18, the user may be able to use display screen 1800 to customize various conditions related to the display of one or more interactive television overlays (e.g., FLIP overlay, BROWSE overlay, etc.) on top of video for channel 25. For example, when the display of one or both of the FLIP and BROWSE overlays is initially disabled (e.g., based on instructions provided to user equipment by an interactive television service provider to set the display time of the overlays to 0 seconds), the user may be able to use display screen 1800 to enable the display of one or both of the overlays (e.g., using option 1802). Other display screens (e.g., similar to display screen 1800) may be provided by the interactive television application for customizing the display of the one or more overlays for other channels (e.g., channel 22, channel 23, etc.). In other examples, the user may be able to simultaneously customize the display of the one or more interactive, television overlays for a group of related television channels (e.g., a group of channels having the same television broadcaster, the entire group of television channels for which a default set of information types does not apply, etc.). In some embodiments of the present invention, one or more display screens (e.g., similar to display screen 1800) may be presented to a back-office representative of an interactive television service provider to allow the service provider to customize the display of interactive television overlays for the user (e.g., in accordance with negotiations with one or more television broadcasters). Back-office user interactions with these display screens may, for example, cause instructions for customizing the display of one or more interactive television overlays to be transmitted to user equipment where an interactive television application implemented at least partially on user equipment processes the instructions to generate various interactive television displays.

The conditions that are initially displayed for the user in overlay settings display screen 1800 may represent the conditions that govern the display of interactive television overlays absent user modification of the conditions. The initially displayed conditions may have been determined by, for example, a back office of the interactive television application based on negotiations with the television broadcaster for channel 25. The initially displayed conditions may have governed the display of, for example, FLIP overlay 1202 (FIG. 12) and BROWSE overlay 1602 (FIG. 16) on top of video (1204, 1604) for channel 25. In particular, referring to FIGS. 12, 16, and 18, the conditions associated with options 1802-1810 in overlay settings display screen 1800 may have caused overlays 1202 and 1602 to be enabled, to exclude advertising content, logos or program descriptions, and to include program titles (1206, 1606), channels (1208, 1608), run times (1212, 1612), and ratings (1210, 1610). The conditions associated with options 1812-1818 may have caused overlays 1202 and 1602 to be displayed in a banner-like format, in blue color, in Arial bold font, and towards the bottom of the user's display.

In the example of FIG. 18, the user may customize conditions associated with the display of interactive television overlays on top of video for a given television channel using a plurality of pull-down menus. Any other suitable user input interface feature may be used (e.g., data entry fields, on-screen check boxes, etc.). The user may, for example, select "YES—0s" 1828 from pull-down menu 1802 to cause the interactive television application to set the display time of one or more types of interactive television overlays that are displayed on top of video for channel 25 to zero seconds. Such a user selection may effectively disable the display of the one or more interactive television overlays on top of video for channel 25. As another example, if the display of overlays on top of video for television channel 25 were initially disabled, the user may be able to use pull-down menu 1802 to enable the overlays to be displayed. The user may customize any other conditions associated with the display of interactive television overlays on top of video for a given television channel. For example, the user may use pull-down menu 1804 to customize the display of advertising content in interactive television overlays (e.g., to enable the display of advertisements, to enable only the display of advertisements that are associated with channel 25, etc.). In some embodiments, the user may not be allowed to customize all aspects of an interactive television overlay. For example, the user may not be allowed to disable the display of advertisements in an overlay.

Figure 19:
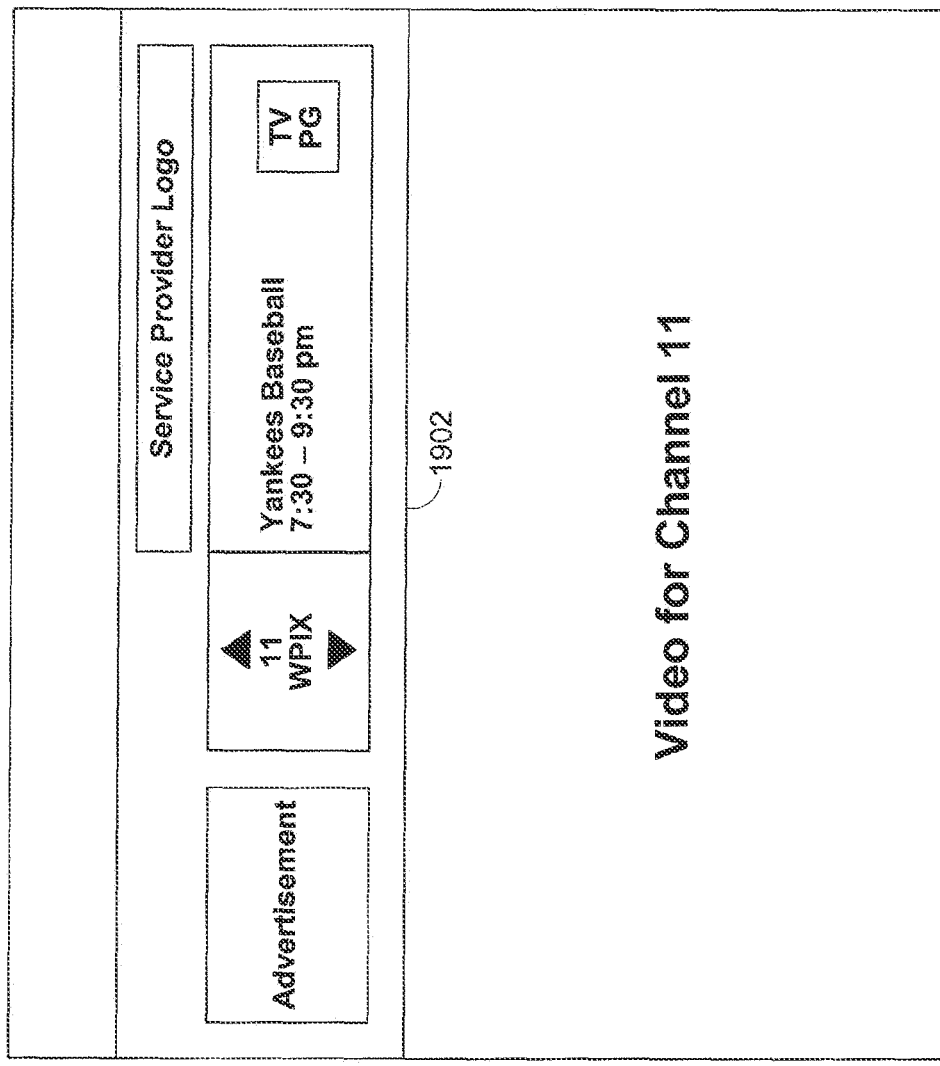
FIG. 19 shows an illustrative FLIP overlay that has been automatically customized by the interactive television application based on data indicating the typical content of the underlying video.

In some embodiments of the present invention, the interactive television application may automatically adjust the display of interactive television overlays (e.g., in real time based on data received by user equipment) based on data indicating the typical content of video for a given television channel or program. For example, the interactive television application may adjust one or more of the size, shape, content and location of one or more types of overlays (e.g., FLIP, BROWSE) based on data indicating that the channel or program on which the overlay is displayed shows, for example, one or more of scrolling headlines, stock quotes, sports scores and statistics (e.g., during broadcast of a baseball game), and closed captions. The display of interactive television overlays may be adjusted in any other way in order to avoid obscuring content typically included in video for a given television channel or program (e.g., displaying an interactive television overlay with a perceived partial transparency such that underlying sports scores that are typically displayed can be viewed by the user, displaying video that is typically displayed under an overlay instead displayed in a reduced size video window). User television equipment may receive data indicating the typical content of a television channel or program in any suitable manner such as, for example, from data source 120 or service provider 142 (FIG. 1). A television broadcaster may, for example, provide data indicating which of its channels or programs includes data that should not be obscured, or may provide data indicating preferred characteristics (e.g., size, shape, location, etc.) of one or more types of overlays that will prevent specific content of its channels or programs from being obscured. The interactive application may or may not allow the user to change these preferred overlay characteristics. In one embodiment, in response to the interactive television application detecting that a television program is accompanied by closed caption data, the interactive television application may display an overlay in such a way as to avoid obscuring the closed captions. As another example, closed captions may only be avoided when a user has selected an option to view closed captions. FIG. 19 shows a customized FLIP overlay display screen 1900. FLIP overlay 1902 may be displayed in a top portion of a user's display screen in response to, for example, the interactive television application determining that the video for the underlying television program typically includes sports statistics (e.g., a baseball player's batting average) along the bottom of the display. The display arrangement of FLIP overlay 1902 is only illustrative, and any other suitable display arrangement may be provided. For example, an overlay may be displayed with less content (e.g., fewer information types) in order to reduce the overlay size, thereby reducing the portion of the underlying video that is unobscured.

Figure 20:
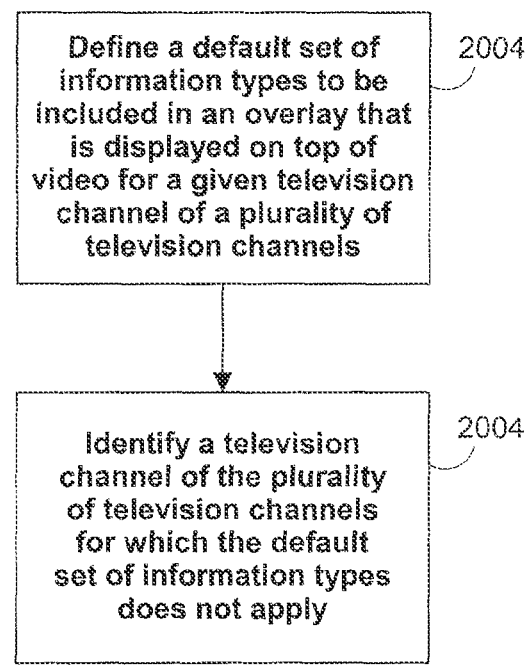
FIG. 20 is a flow chart of illustrative steps involved in customizing the display of an interactive television overlay where a default set of overlay information types is defined in accordance with the present invention.

FIG. 20 is a flow chart of illustrative steps involved in customizing the display of an interactive television overlay where a default set of information types is defined in accordance with one embodiment of the present invention. At step 2002, the interactive television application (e.g., an interactive television program guide) may define a default set of information types to be included in an interactive television overlay that is displayed on top of video for a given television channel of a plurality of television channels. For example, the interactive television application may define a default set of FLIP information types including the program schedule information types of program title (e.g., title 706 (FIG. 7)), channel (e.g., channel 708), rating (e.g., rating 710), run time (e.g., run time 712) or any other suitable information types (e.g., a program description). As another example, the interactive television application may define a default set of information types including other information types such as an advertisement (e.g., advertisement 814 (FIG. 8)), a device provider logo (e.g., logo 816), and other suitable information types (e.g., an internet link or an applet). The default set of information types may be defined based on, for example, application data received by user equipment (108, 110, 112) of FIG. 1 from data source 120 or any other suitable equipment or location, user inputs received via user input interface 614 (FIG. 6), or a combination thereof.

At step 2004, a television channel of the plurality of television channels may be identified as a channel for which the default set of information types does not apply. For example, a particular television channel (e.g., channel 25) may be identified as a television channel for which the display of an overlay on top of video for the particular television channel is disabled (e.g., as shown in FIG. 9). As another example, the particular television channel may be identified as a television channel for which the display of an overlay is to be customized relative to the default set of information types (e.g., FLIP overlay 1302 (FIG. 13) being customized relative to FLIP overlay 702 (FIG. 7)). The user may have, for example, used one or more interactive television display screens (e.g., similar to display screen 1800 (FIG. 18)) to customize the display of the interactive television overlay on top of video for the particular channel.

Figure 21:
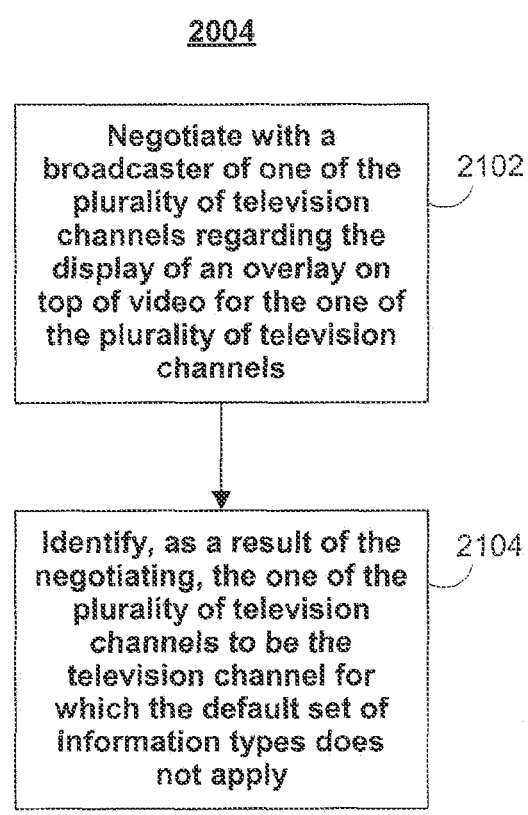
FIG. 21 is a flow chart of illustrative sub-steps involved in identifying a television channel for which a default set of overlay information types does not apply in accordance with the present invention.

In some embodiments of the present invention, the particular television channel for which the default set of information types does not apply may be identified based on negotiations with the television broadcaster of the particular television channel. FIG. 21 is a flow chart of illustrative sub-steps involved in step 2004 (FIG. 19). At step 2102, negotiations regarding the display of an interactive television overlay on top of video for a television channel of the plurality of channels may be held with the television broadcaster for that channel. For example, a back-office representative of the interactive television application service provider may negotiate with the television broadcaster of the television channel (e.g., over the telephone, electronically via e-mail, in person, or using any other suitable electronic or non-electronic approach). At step 2104, the television channel may be identified as a result of the negotiations as the particular television channel for which the default set of information types does not apply. For example, it may be determined that interactive television overlays that are displayed on top of video for the television channel are not to include advertising content or other content. Suitable equipment in system 100 (FIG. 1) (e.g., a data source associated with the television broadcaster of the particular channel) may be used to process this data into an electronic form that is suitable for distribution and use by system 100.

Figure 22:
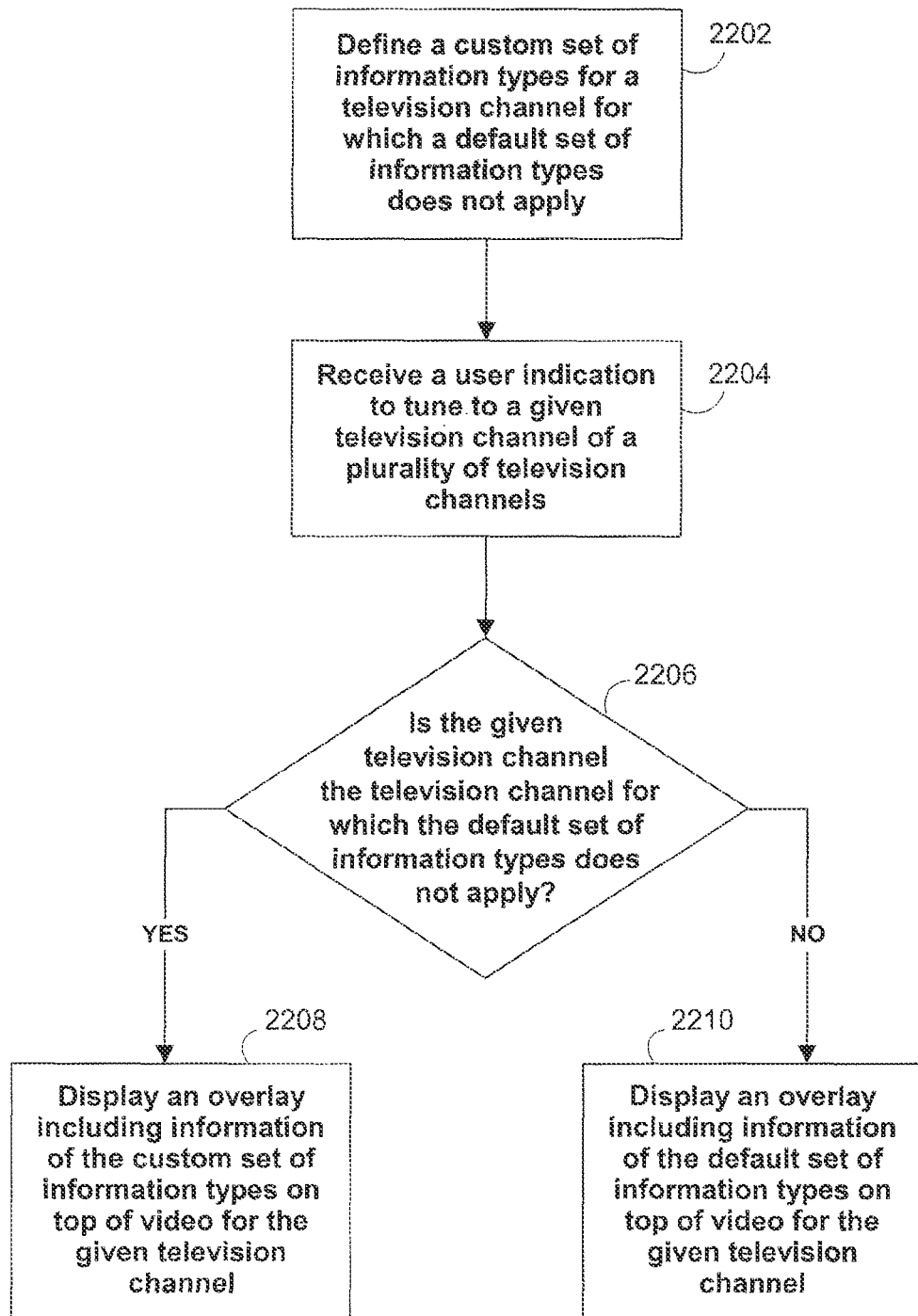
FIG. 22 is a flow chart of illustrative steps involved in displaying an interactive television overlay on top of video for a television channel where both default and custom sets of overlay information types are defined in accordance with the present invention.

In some embodiments of the present invention, information of a custom set of information types may be included in an interactive television overlay that is displayed on top of video for a particular television channel. FIG. 22 is a flow chart of illustrative steps involved in displaying an interactive television overlay on top of video for a television channel where both default and custom sets of information types are defined in accordance with the present invention. At step 2202, the interactive television application may define a custom set of information types for a particular television channel for which the default set of information types does not apply. For example, a custom set of information types comprising less than all information types of the default set of information types may be defined for the particular television channel (e.g., the custom set of FLIP overlay information types of FLIP overlay 1202 (FIG. 12) comprising less than all information types of FLIP overlay 802 (FIG. 8)). As another example, a custom set of information types comprising information types that are not included in the default set of information types may be defined for the particular television channel (e.g., the custom set of information types of BROWSE overlay 1702 (FIG. 17) including information types 1706 and 1708 that are not included in BROWSE overlay 1502 (FIG. 15)). The custom set of information types may be defined by data source 120 (FIG. 1), based on user inputs to a suitable display screen such as display screen 1800 (FIG. 18), or by any other suitable equipment or location.

At step 2204, the interactive television application may receive a user indication to tune to a given television channel of the plurality of television channels (e.g., channel 22, channel 23, channel 25, etc.). The interactive television application may determine whether the given television channel is the particular television channel for which a custom set of information types is defined at step 2206. For example, an interactive television application implemented at least partially on user equipment (108, 110, 112) of FIG. 1 may use stored data (e.g., stored in storage 608 (FIG. 6)) to determine whether the given television channel is the particular television channel. If the given television channel is the particular television channel, the interactive television application may display an overlay including information of the custom set of information types on top of video for the given television channel at step 2208. If the given television channel is not the particular television channel, the interactive television application may display an overlay including information of the default set of information types on top of video for the given television channel at step 2210.

Figure 23:
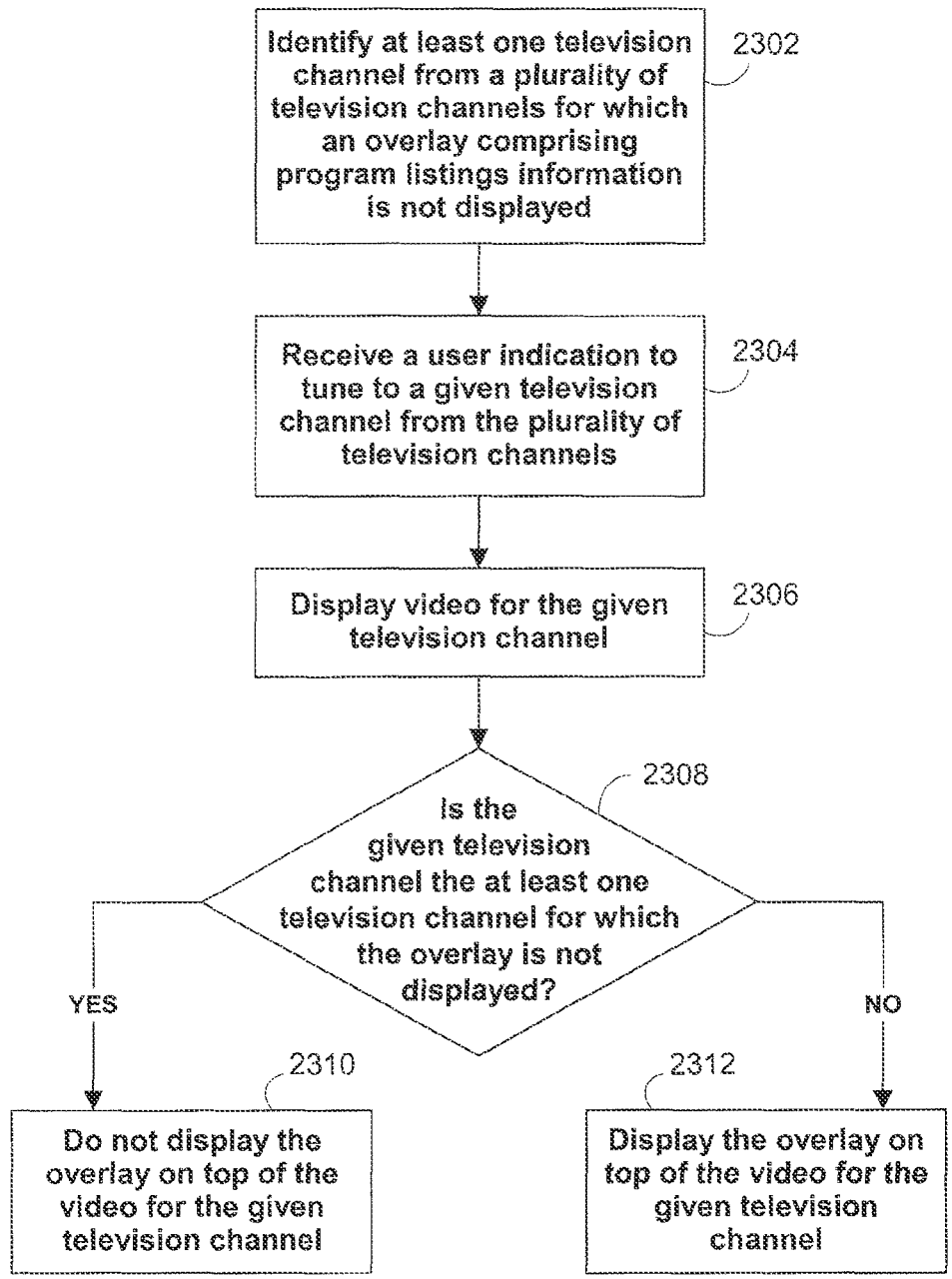
FIG. 23 is a flow chart of illustrative steps involved in disabling the display of an interactive television overlay on top of video for a particular television channel of a plurality of television channels in accordance with the present invention.

FIG. 23 is a flow chart of illustrative steps involved in disabling the display of an interactive television overlay on top of video for a particular television channel of a plurality of television channels in accordance with the present invention. The interactive television application may identify at least one television channel from the plurality of television channels for which an overlay comprising program listings information is not displayed at step 2302. For example, a back office of the interactive television application provider may identify the at least one television channel based on negotiations with a television broadcasters of the at least one television channel (e.g., negotiations conducted using steps similar to those of FIG. 20). As another example, the interactive television application may receive data from a user (e.g., via user input interface 614 (FIG. 6)) indicating that the display of the overlay on top of video for the at least one television channel is to be disabled.

At step 2304, the interactive television application may receive a user indication to tune to a given television channel of the plurality of television channels. Video for the given television channel may be displayed for the user at step 2306 (e.g., using user computer equipment 112 (FIG. 1)). At step 2308, the interactive television application may determine whether the given television channel is the at least one television channel for which the overlay is not displayed. If the given television channel is the at least one television channel, the interactive television application may not display the overlay on top of the video for the given television channel at step 2310. If the given television channel is not the at least one television channel, the interactive television application may display the overlay including program listings information (e.g., a FLIP or BROWSE overlay) on top of the video for the given television channel at step 2312.

Figure 24:
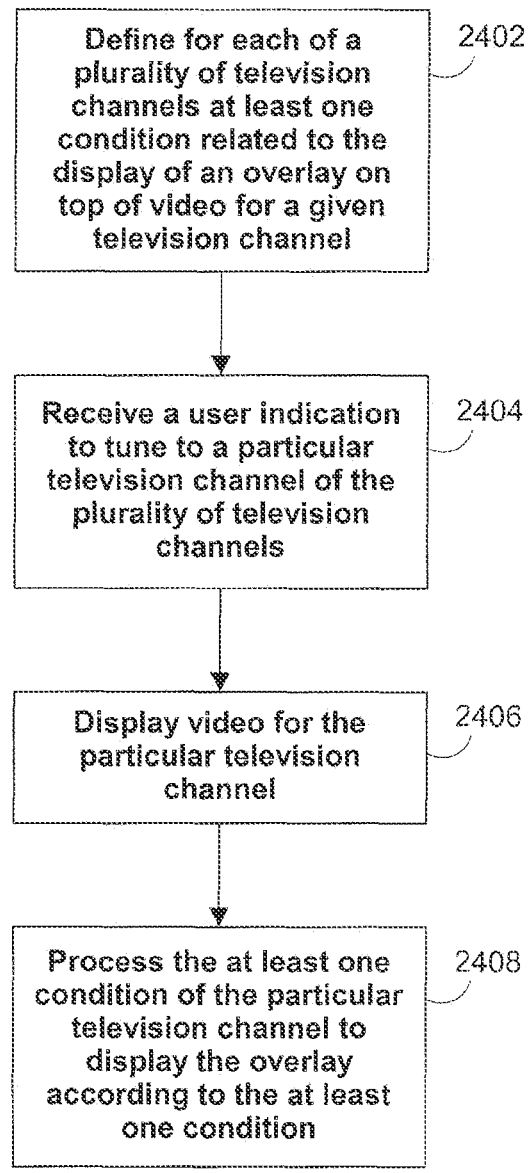
FIG. 24 is a flow chart of illustrative steps involved in customizing the display of an interactive television overlay on top of video for a given television channel in accordance with one or more defined conditions for that channel in accordance with the present invention.

FIG. 24 is a flow chart of illustrative steps involved in customizing the display of an interactive television overlay on top of video for a given television channel in accordance with one or more defined conditions for that channel in accordance with the present invention. At step 2402, the interactive television application may define for some or all of a plurality of television channels at least one condition related to the display of an overlay on top of video for a given television channel. For example, a condition related to whether the overlay is to be displayed on top of video for a particular television channel may be defined. As another example, conditions associated with the size, shape, color, and position of the overlay may be defined. Still another example, conditions associated with the types of information (e.g., types of program schedule information or other types of information) to be included in the overlay may be defined. Conditions related to the display of the interactive television overlays may be defined, for example, by data source 120 (FIG. 1) or other suitable equipment or location (e.g., television distribution facility 104 (FIG. 1)) and transmitted to user equipment, or may be defined based on user inputs via a suitable user input interface such as user input interface 614 of FIG. 6 (e.g., user inputs corresponding to user selections in an interactive television display screen such as display screen 1800 (FIG. 18)). If the display conditions are not specified for a specific channel, the application may use a default set of conditions, which may or may not have been defined by the user.

At step 2404, the interactive television application may receive a user indication to tune to a particular television channel of the plurality of television channels (e.g., a user pressing numeric keys of remote control keys 404 (FIG. 4) corresponding to the channel number of the particular channel). Video for the particular television channel may be displayed at step 2406. At step 2408, the interactive television application may process the at least one condition of the particular television channel to display the overlay according to the at least one condition. For example, in response receiving a user indication to tune to a particular television channel for which the overlay is to include information of the information type of an advertisement, the interactive television application may display the overlay including an advertisement. As another example, the interactive television application may prevent the display of the overlay if a condition associated with the particular television channel indicates that the overlay is to be disabled (e.g., if the display time of the overlay is set to 0 seconds).

The foregoing is merely illustrative of the principles of this invention and various modifications can be made by those skilled in the art without departing from the scope and spirit of the invention.

What is claimed is:

1. A method comprising:
   storing a plurality of different items that are associated with one of a plurality of information types;
   receiving a user indication to receive a media asset from a content source;
   generating a display of the media asset in response to receiving the user indication;
   retrieving, from memory, data that identifies subject matter of the media asset;
   comparing the subject matter identified by the data to a subject matter type;
   in response to determining that the subject matter identified by the data matches the subject matter type:
      selecting an item of the plurality of items that is specific to the media asset; and
      generating a first simultaneous presentation of the media asset, the selected item, and information corresponding to the media asset; and
   in response to the determining that the subject matter identified by the data fails to match the subject matter type:
      generating a second simultaneous presentation of the media asset and the information corresponding to the media asset without including the selected item.

2. The method of claim 1, wherein the subject matter identified by the data comprises a category of the media asset.

3. The method of claim 1, wherein the item includes a sporting event score associated with the media asset.

4. The method of claim 1, wherein the plurality of information types comprises at least one of news, stock quotes, and sporting event scores.

5. The method of claim 1, wherein the media asset comprises a sporting event.

6. The method of claim 5, wherein the item includes a score of the sporting event.

7. The method of claim 1, wherein the information corresponding to the media asset includes program information.

8. The method of claim 1, wherein the information corresponding to the media asset includes a title.

9. The method of claim 1, wherein the user indication is a request to tune to a channel.

10. The method of claim 1, wherein generating at least one of the first simultaneous presentation and the second simultaneous presentation includes presenting an overlay over the media asset.

11. A system comprising:
    a storage device configured to store a plurality of different items that are associated with one of a plurality of information types;
    a user input interface; and
    control circuitry configured to:
       receive, from the user input interface, a user indication to receive a media asset from a content source;
       generate a display of the media asset in response to receiving the user indication;
       retrieve, from the storage device, data that identifies subject matter of the media asset;
       compare the subject matter identified by the data to a subject matter type;
       in response to determining that the subject matter identified by the data matches the subject matter type:
          select an item of the plurality of items that is specific to the media asset; and
          generate a first simultaneous presentation of the media asset, the selected item, and information corresponding to the media asset; and
       in response to the determining that the subject matter identified by the data fails to match the subject matter type:
          generate a second simultaneous presentation of the media asset and the information corresponding to the media asset without including the selected item.

12. The system of claim 11, wherein the subject matter identified by the data comprises a category of the media asset.

13. The system of claim 11, wherein the item includes a sporting event score associated with the media asset.

14. The system of claim 11, wherein the plurality of information types comprises at least one of news, stock quotes, and sporting event scores.

15. The system of claim 11, wherein the media asset comprises a sporting event.

16. The system of claim 15, wherein the item includes a score of the sporting event.

17. The system of claim 11, wherein the information corresponding to the media asset includes program information.

18. The system of claim 11, wherein the information corresponding to the media asset includes a title.

19. The system of claim 11, wherein the user indication is a request to tune to a channel.

20. The system of claim 11, wherein the control circuitry is further configured to generate at least one of the first simultaneous presentation and the second simultaneous presentation by presenting an overlay over the media asset.

* * * * *